US009153243B2

(12) United States Patent
Yoshizuka et al.

(10) Patent No.: US 9,153,243 B2
(45) Date of Patent: Oct. 6, 2015

(54) IMAGING DEVICE, PROGRAM, MEMORY MEDIUM, AND NOISE REDUCTION METHOD

(75) Inventors: Yoko Yoshizuka, Tokyo (JP); Mitsuhiro Okazaki, Saitama (JP); Kosuke Okano, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/980,892

(22) PCT Filed: Jan. 17, 2012

(86) PCT No.: PCT/JP2012/050820
§ 371 (c)(1),
(2), (4) Date: Jul. 22, 2013

(87) PCT Pub. No.: WO2012/102130
PCT Pub. Date: Aug. 2, 2012

(65) Prior Publication Data
US 2013/0293747 A1 Nov. 7, 2013

(30) Foreign Application Priority Data

Jan. 27, 2011 (JP) ................................ 2011-015051
Feb. 18, 2011 (JP) ................................ 2011-032786

(51) Int. Cl.
H04N 5/217 (2011.01)
G10L 21/0216 (2013.01)
(Continued)

(52) U.S. Cl.
CPC ......... *G10L 21/0216* (2013.01); *G10L 21/0232* (2013.01); *G10L 25/84* (2013.01); *H04N 5/217* (2013.01); *H04N 5/23219* (2013.01); *H04N 5/2353* (2013.01)

(58) Field of Classification Search
CPC ..... H04N 5/357; H04N 5/3572; H04N 5/217; H04N 5/23219; H04N 5/2353; H04N 5/911; H04N 5/91; G01L 15/20
USPC .......................... 348/241, 243; 704/226, 233
See application file for complete search history.

(56) References Cited

U.S. PATENT DOCUMENTS 7,203,326 B2 * 4/2007 Matsuzawa et al. ......... 381/94.2
2005/0152563 A1 7/2005 Amada et al.
2009/0254341 A1 10/2009 Yamamoto et al.
2010/0185308 A1 7/2010 Yoshida et al.

FOREIGN PATENT DOCUMENTS

JP A-2000-81900 3/2000
JP A 2005-195955 7/2005
(Continued)

OTHER PUBLICATIONS

Apr. 24, 2012 Search Report issued in International Patent Application No. PCT/JP2012/050820 (with translation).
(Continued)

*Primary Examiner* — Yogesh Aggarwal
(74) *Attorney, Agent, or Firm* — Oliff PLC

(57) ABSTRACT

Provided are an imaging device, program, memory medium, and noise reduction method capable of appropriately reducing noise without causing degradation in a target sound such as voice. The imaging device of the present invention has: a video imaging unit for capturing video; a signal converter for converting a sound generated during video capture to a sound signal; subject determination units that predict or recognize a specific subject; a noise detector for detecting noise included in the sound generated during video capture; a noise reduction unit for reducing the noise signal from the sound signal; a voice detector for detecting non-noise signals in the sound signal; and a noise reduction performance change unit that lowers the noise signal reduction performance of the noise reduction unit when the subject determination units predict or recognize the specific subject.

22 Claims, 30 Drawing Sheets

(51) Int. Cl.
*G10L 21/0232* (2013.01)
*G10L 25/84* (2013.01)
*H04N 5/232* (2006.01)
*H04N 5/235* (2006.01)

(56) References Cited

FOREIGN PATENT DOCUMENTS

| JP | A 2006-229401 | 8/2006 |
|----|---------------|--------|
| JP | A-2006-270591 | 10/2006 |
| JP | A 2008-252389 | 10/2008 |
| JP | A 2009-251134 | 10/2009 |
| JP | A 2009-294537 | 12/2009 |
| JP | A 2010-135876 | 6/2010 |
| JP | A 2010-187363 | 8/2010 |

OTHER PUBLICATIONS

Sep. 2, 2014 Office Action issued in Japanese Patent Application No. 2011-032786 (with translation).

Aug. 19, 2014 Office Action issued in Japanese Patent Application No. 2011-015051 (with translation).

* cited by examiner

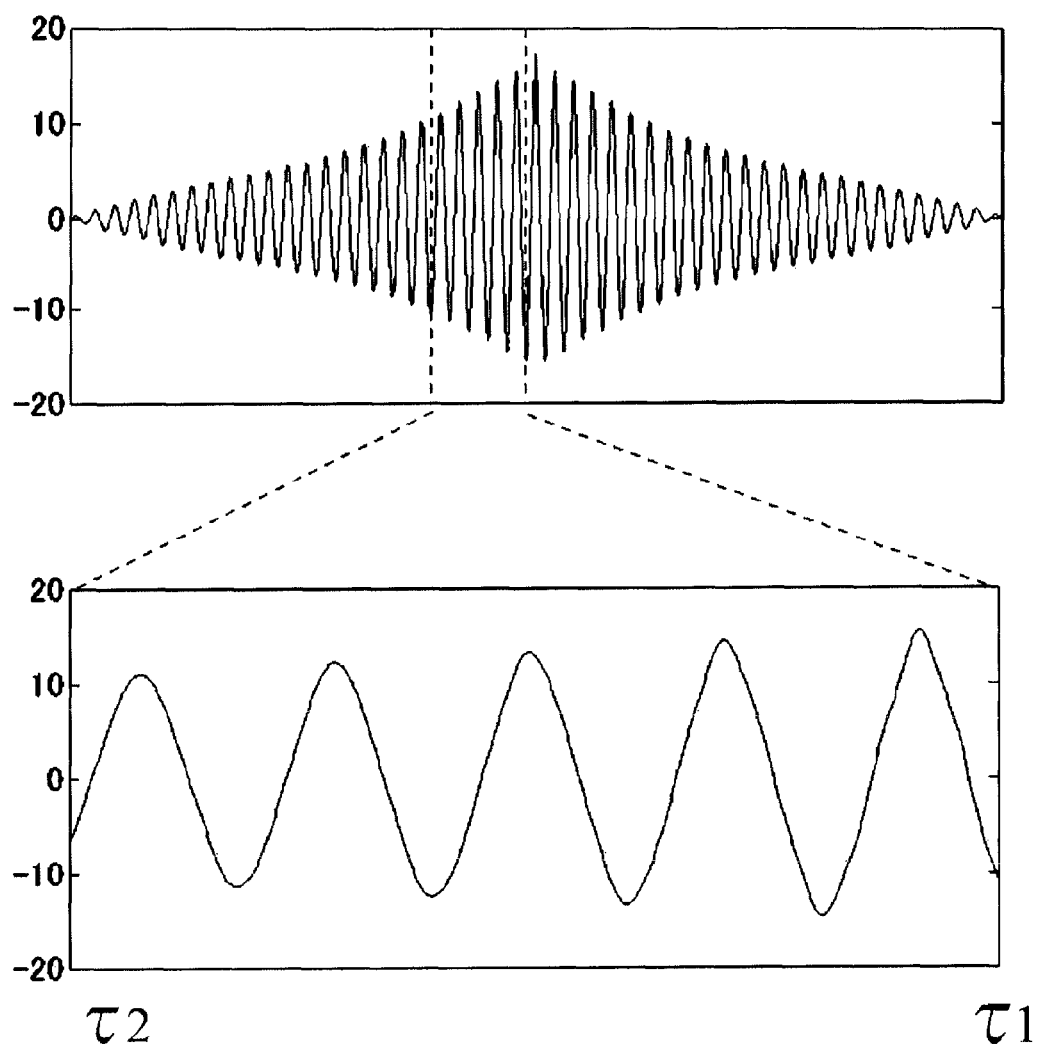

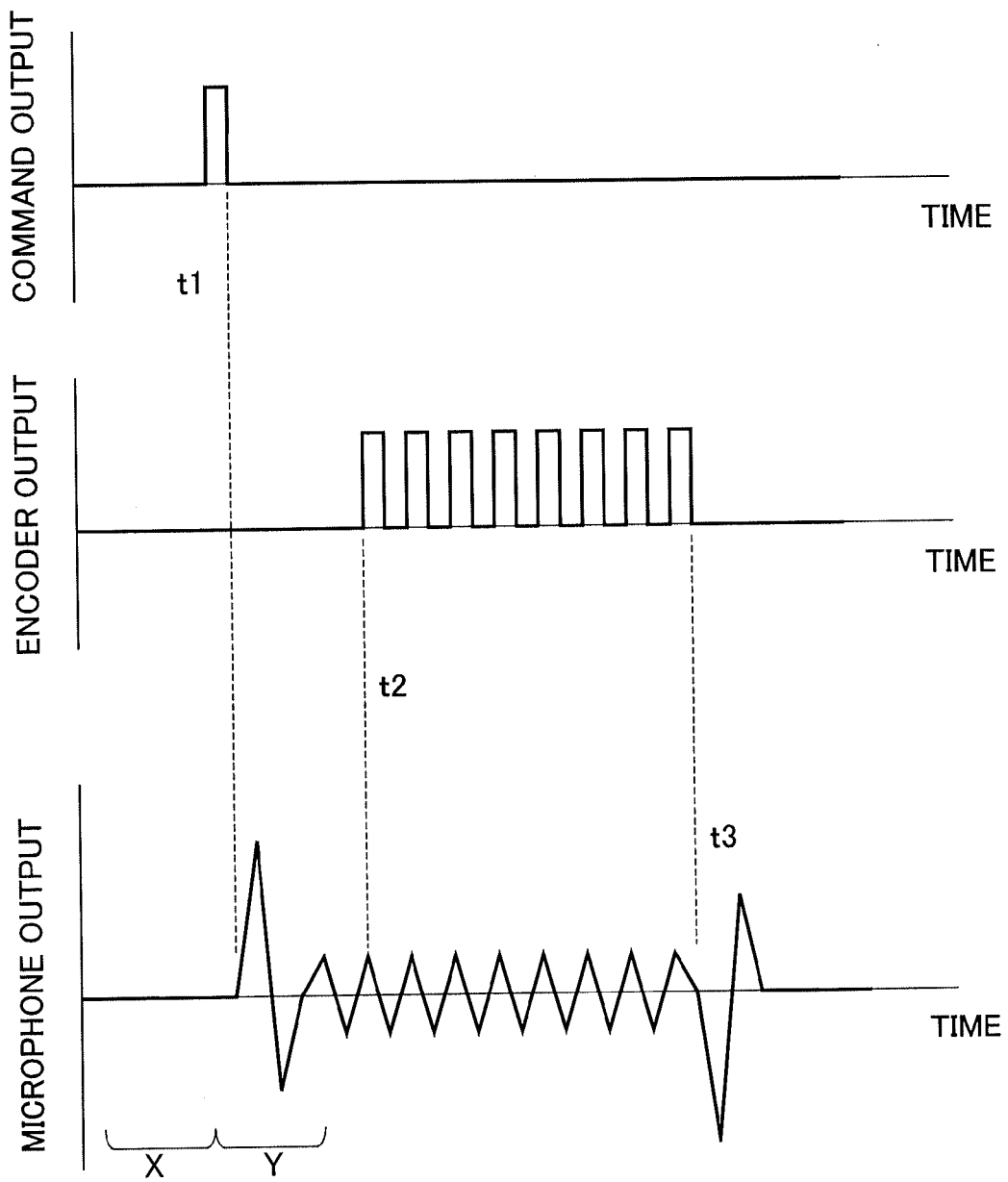

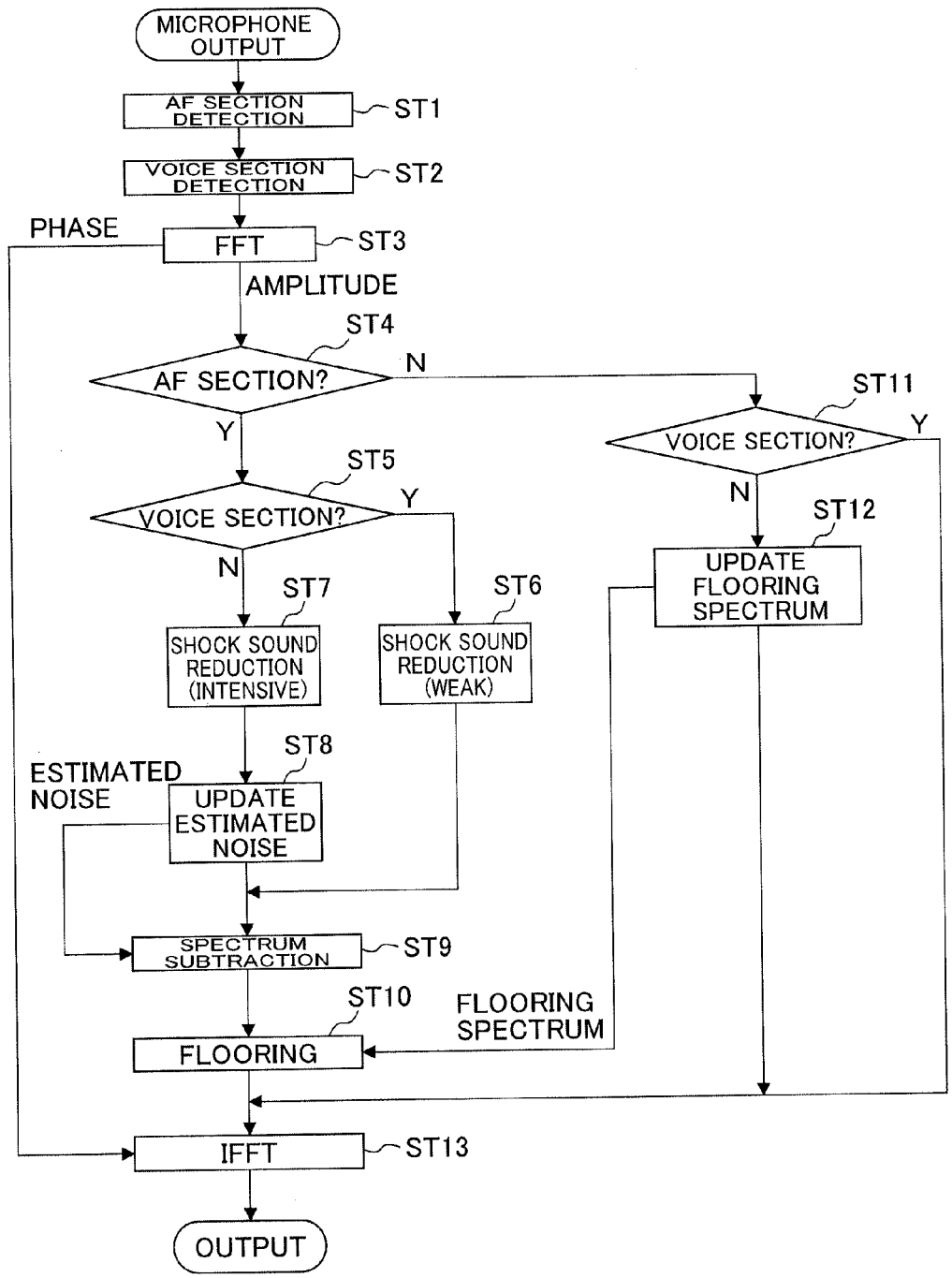

SPECTRUM AFTER FLOORING
(FLOORING SPECTRUM A IS USED)

IMAGING DEVICE, PROGRAM, MEMORY MEDIUM, AND NOISE REDUCTION METHOD

TECHNICAL FIELD

The present invention relates to an imaging device, a program, a memory medium, and a noise reduction method.

BACKGROUND ART

In recent years, an imaging device having a function of shooting a movie has become popular. Sound generated during the shooting of a movie sometimes includes noise. For example, the driving sound of an auto-focusing lens corresponds to noise. In particular, such driving sound is loud in a lens barrel which is not designed in consideration of the movie shooting, in which case the noise increases. In view of this, a noise reduction process may be performed.

For example, there is a technique (VAD: Voice Activity Detection) for distinguishing a sound signal including human voice (voice section) from a sound signal excluding human voice (non-voice section) by emphasizing and extracting the human voice included in sound signals collected with a microphone (see Patent Document 1). The noise can be suppressed by calculating estimated noise with the use of the sound signal in the non-voice section and subtracting the estimated noise from the sound signal utilizing VAD (for example, see Patent Document 1).

During the shooting of a movie with an imaging device capable of shooting a movie, the noise such as the operation sound caused along with the operation of a drive unit of the auto-focusing lens (hereinafter, AF noise) might be collected by a sound collection device such as a microphone and mixed in with target sound such as the voice of a subject, in which case the quality of the target sound is deteriorated.

As a method of reducing the AF noise as above, a method for reducing the noise has been suggested in which a power value of a voice signal input before the operation of the AF drive unit is obtained and the flooring coefficient is controlled (varied) on the basis of the power value of the voice signal (for example, see Patent Document 2).

[Patent Document 1] Japanese Unexamined Patent Application, Publication No. 2009-294537
[Patent Document 2] Japanese Unexamined Patent Application, Publication No. 2008-252389

DISCLOSURE OF THE INVENTION

Problems to be Solved by the Invention

However, if the estimated noise is subtracted from the sound signal uniformly in the voice section and in the non-voice section as disclosed in Patent Document 1, the voice of a person or an animal such as a pet to be recorded in the voice section deteriorates.

In the noise reduction process disclosed in Patent Document 2, although the AF noise can be reduced, the target sound such as voice is highly likely to deteriorate.

It is an object of the present invention to provide an imaging device, a program, a memory medium, and a noise reduction method which can reduce the noise appropriately without deteriorating the target sound such as voice.

Means for Solving the Problems

The present invention solves the problem by the solution as follows.

According to the first aspect of the present invention, there is provided an imaging device having: a movie shooting unit for shooting a movie; a signal conversion unit for converting sound generated during the shooting of the movie into a sound signal; a subject determination unit for predicting or recognizing a specific subject; a noise detection unit for detecting noise included in the sound generated during the shooting of the movie; a noise reduction unit for reducing a noise signal from the sound signal; a voice detection unit for detecting a non-noise signal from the sound signal; and a noise reduction performance change unit for decreasing performance of the noise reduction unit for reducing the noise signal when the subject determination unit predicts or recognizes the specific subject.

The noise reduction unit may reduces the noise signal from the sound signal on the basis of a noise reduction coefficient; and when the subject determination unit predicts or recognizes the specific subject, the noise reduction performance change unit may set the noise reduction coefficient to a relatively low-level reduction coefficient so that the performance of reducing the noise signal is decreased.

When the subject determination unit does not predict or recognize the specific subject, the noise reduction unit may set the noise reduction coefficient to a normal-level reduction coefficient, which is larger than the low-level reduction coefficient.

The subject determination unit may be a face recognition unit for recognizing presence of a face of the subject on the basis of a video signal taken by the movie shooting unit.

The subject determination unit may be a scene mode unit for predicting the specific subject for each of a plurality of prepared shooting modes.

The noise detection unit may detect the noise by detecting at least an auto-focusing driving signal.

The voice detection unit may detect the non-noise signal from the sound signal in a range from a lower-limit threshold to an upper-limit threshold of a frequency of the sound signal; and when the subject determination unit predicts or recognizes the specific subject, the voice detection unit may lower the lower-limit threshold from a first lower-limit threshold to a second lower-limit threshold so as to increase a detection range of the non-noise signal.

When the subject determination unit may not predict or recognize the specific subject, the voice detection unit may set the lower-limit threshold to the first lower-limit threshold.

According to the second aspect of the present invention, there is provided a program for allowing a computer to operate as: a subject determination unit for predicting or recognizing a specific subject; a noise reduction unit for reducing a noise signal from a sound signal corresponding to sound generated during movie shooting; a voice detection unit for detecting a voice signal of a person or an animal from the sound signal; and a noise reduction performance change unit for decreasing performance of the noise reduction unit for reducing the noise signal when the subject determination unit predicts or recognizes the specific subject.

According to the third aspect of the present invention, there is provided a computer-readable memory medium storing a program, the program allowing a computer to operate as: a subject determination unit for predicting or recognizing a specific subject; a noise reduction unit for reducing a noise signal from a sound signal corresponding to sound generated during movie shooting; a voice detection unit for detecting a voice signal of a person or an animal from the sound signal; and a noise reduction performance change unit for decreasing performance of the noise reduction unit for reducing the noise signal when the subject determination unit predicts or recognizes the specific subject.

According to the fourth aspect of the present invention, there is provided a noise reduction method having the steps of: shooting a movie; converting sound generated during the shooting of the movie into a sound signal; predicting or recognizing a specific subject; detecting noise included in the sound generated during the shooting of the movie; reducing a noise signal from the sound signal; detecting a voice signal of a person or an animal from the sound signal; and decreasing performance of reducing the noise signal when the specific subject is predicted or recognized.

According to the fifth aspect of the present invention, there is provided an imaging device having: a sound collection device; a voice section detection unit for detecting a voice section from sound information collected with the sound collection device; and a noise reduction process unit for performing a different noise reduction process on the basis of a detection result of the voice section detection unit.

The imaging device may further have a noise timing detection unit for detecting generation timing of operation noise from operation information of a driving unit in the imaging device, wherein the noise reduction process unit performs the different noise reduction process on the basis of a detection result of the noise timing detection unit.

The noise reduction process unit may perform a first noise reduction process when the voice section detection unit detects a voice section, the process being weaker than when the voice section detection unit detects a non-voice section.

The noise reduction process unit may perform a second noise reduction process for estimating noise from the sound information when the voice section detection unit detects the non-voice section, and subtracting the estimated noise from the sound information before the subtraction of the estimated noise.

The noise reduction process unit may obtain a flooring spectrum from the sound information when the voice section detection unit detects the non-voice section, and performs a flooring process on the sound information, which is before the flooring process, using the flooring spectrum.

The voice section detection unit may detect the voice section using a peak value of an autocorrelation function obtained by cutting out a part of a voice waveform.

According to the sixth aspect of the present invention, there is provided a noise reduction method for an imaging device, having: detecting a voice section from collected sound information; and performing a different noise reduction process on the basis of a detection result of the voice section.

Generation timing of operation noise may be detected from operation information of a driving unit in the imaging device; and the different noise reduction process may be performed based on a detection result of the generation timing of the operation noise.

A first noise reduction process may be performed when the voice section is detected, the process being weaker than when a non-voice section is detected.

The noise reduction method may have performing a second noise reduction process for estimating noise from sound information when the non-voice section is determined, and subtracting the estimated noise from the sound information before the subtraction of the estimated noise.

The noise reduction method may have obtaining a flooring spectrum from the sound information when the non-voice section is determined; and performing a flooring process on the sound information, which is before the flooring process, using the flooring spectrum.

The voice section may be detected using a peak value of an autocorrelation function obtained by cutting out a part of a voice waveform.

Effects of the Invention

According to the present invention, an imaging device, a program, a memory medium, and a noise reduction method, which can reduce noise appropriately without deteriorating target sound such as voice can be provided.

BRIEF DESCRIPTION OF THE DRAWINGS

FIG. 9 is a diagram for describing the autocorrelation function of the voice waveform.

FIG. 11 is a diagram for describing the details of the detection of the generation timing of the operation noise by a noise timing detection unit.

FIG. 12 is a flowchart of the noise reduction process operation.

PREFERRED MODE FOR CARRYING OUT THE INVENTION

First Embodiment

Figure 1:
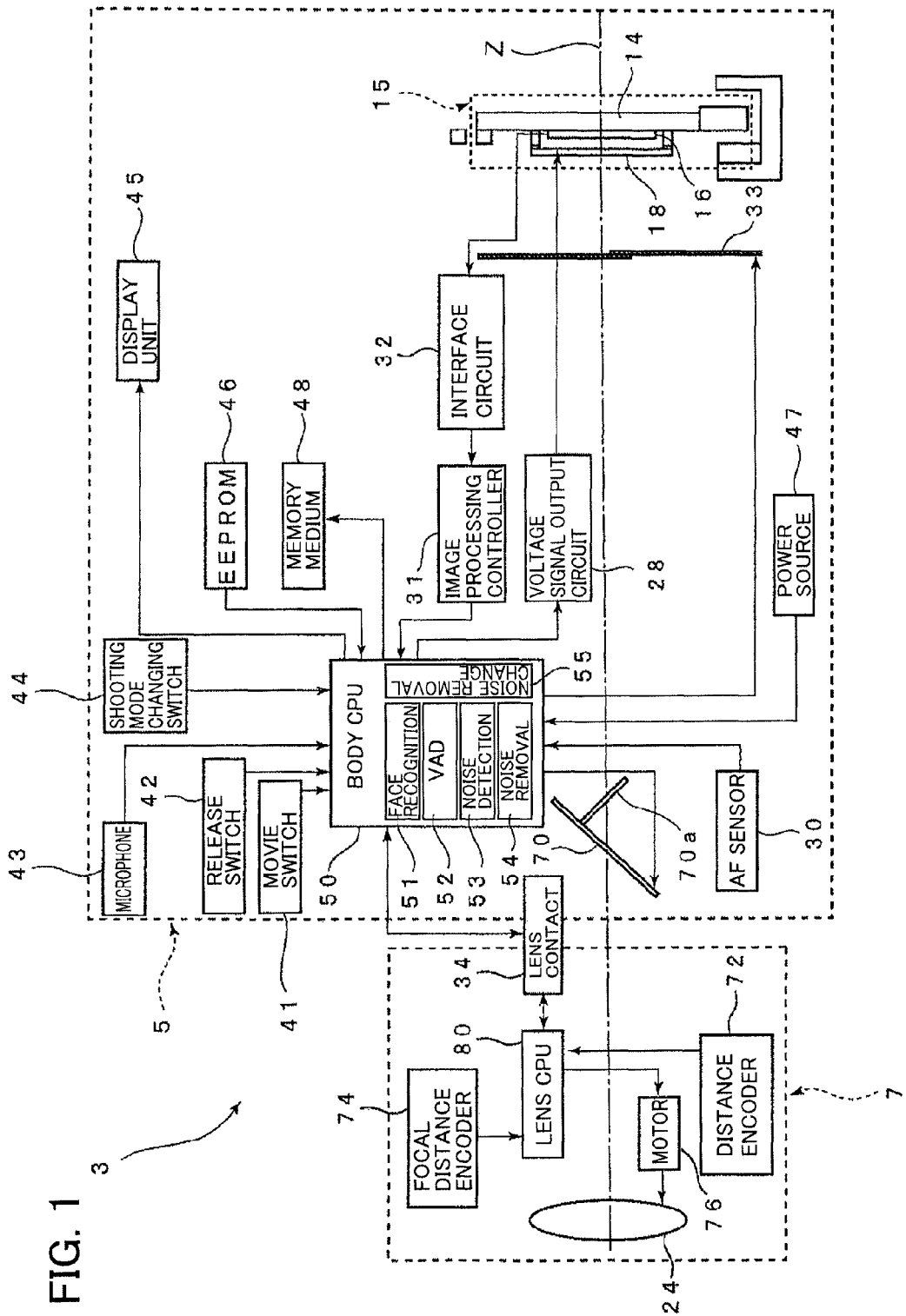
FIG. 1 is a general block diagram of a camera according to a first embodiment of the present invention.

FIG. 1 is a general block diagram of a camera 3 according to a first embodiment of the present invention. The camera 3 includes a camera body 5 and a lens barrel 7. The lens barrel 7 is detachably attached to the camera body 5. The camera according to this embodiment is not limited to a camera with an interchangeable lens as depicted in FIG. 1 but may be a camera in which the lens barrel 7 and the camera body 5 are integrated and the kind of the camera is not particularly limited.

Inside the camera body 5 and the lens barrel 7, a plurality of optical components is disposed along an optical axis Z. In the camera body 5, an image pickup device unit 15 is disposed and a shutter 33 is disposed in front of the image pickup device unit 15 in the optical axis Z direction (the subject side along the Z-axis is referred to as "front of the Z-axis" or "front-direction side of the Z-axis"). A mirror 70 is disposed in front of the shutter 33 in the optical axis Z direction, and an optical lens group 24 incorporated in the lens barrel 7 is disposed in front of the mirror 70.

The camera body 5 incorporates a body CPU 50, and the body CPU 50 is connected to a lens CPU 80 via a lens contact 34. The body CPU 50 has a function of communicating with the lens barrel 7 and a function of controlling the camera body 5. The body CPU 50 includes a face recognition process unit 51, a VAD process unit 52, a noise detection unit 53, a noise reduction process unit 54 and a noise reduction performance change unit 55. The lens contact 34 electrically connects the body CPU 50 and the lens CPU 80 to each other. The body CPU 50 is connected to a power source 47 which supplies electric power to the electronic components included in the camera body and the lens barrel 7.

The body CPU 50 is connected to a movie switch 41, a release switch 42, a microphone 43, a shooting mode changing switch 44, a display unit 45, an EEPROM (nonvolatile memory) 46, the power source 47, a memory medium 48, an image processing controller 31, an AF sensor 30, a voltage signal output circuit 28, and the like. The image processing controller 31 is connected to an image pickup device 16 of the image pickup device unit 15 via an interface circuit 32. The image processing controller 31 and the interface circuit 32 control the image processing of an image taken by the image pickup device 16 on the basis of the signals from the body CPU 50. The image pickup device 16 is, for example, a solid-state image pickup device such as CCD or CMOS.

The image pickup device 16 generates an image signal by performing photoelectric conversion of a beam having passed the optical lens group 24. During the shooting of a movie, the body CPU 50 acquires movie data from this image pickup device 16. The face recognition process unit 51 detects the presence of the face of a specific subject (a person or an animal) using this movie data.

The shooting mode changing switch 44 is provided for the camera body 5 so that a shooter can select an appropriate shooting mode (Scene modes, Auto-mode, P·S·A·M modes, etc.) that matches the shooting situation. As the scene mode, for example, Portrait, Child, Pet, Landscape, Close-up, etc. are prepared in advance. The shooting parameters, etc. appropriate for each scene mode are recorded in the EEPROM 46. The body CPU 50 acquires the necessary shooting parameters from the EEPROM 46 in accordance with the scene mode selected by the shooter. The microphone 43 converts the sound generated during the shooting of the movie into a sound signal.

The display unit 45 is mainly comprises a liquid crystal display device or the like, and displays an output result, a menu, or the like. The release switch 42 is a switch for manipulating the timing of taking a still image. The release switch 42 outputs a half-pressing signal and a fully-pressing signal to the body CPU 50. Upon the input of the half-pressing signal from the release switch 42, the body CPU 50 performs the control of the shooting preparation operation such as AF control or AE control; upon the input of the fully-pressing signal from the release switch 42, the body CPU 50 performs the control of the light exposure operation such as mirror lockup and shutter driving.

A quick-return mirror 70 is for reflecting an image on a finder for deciding the composition, and is out of the optical path during the exposure. The quick-return mirror 70 is driven by a mirror drive unit (for example, a DC motor), which is not shown.

The quick-return mirror 70 is connected to a sub-mirror 70a which guides the light to the AF sensor 30. This sub-mirror 70a is also out of the optical path during the exposure.

The shutter 33 controls the exposure time. Based on the control from the body CPU 50, the shutter 33 is driven by a shutter drive unit (for example, a DC motor), which is not shown.

The AF sensor 30 is a sensor for performing auto-focusing (AF). As this AF sensor 30, a CCD is generally used.

The movie switch 41 depicted in FIG. 1 is a switch for manipulating the timing for shooting the movie. The movie switch 41 outputs the start/stop signals of the shooting to the body CPU 50. Upon the acquisition of the start signal of the shooting from the movie switch 41, the body CPU 50 orders to lock-up the mirror and open the shutter. Thus, the beam having passed the optical lens group 24 is guided to the image pickup device 16 and the shooting of the movie (live view shooting) is started. Upon the acquisition of the stop signal of the shooting from the movie switch 41, the body CPU 50 orders to lock-down the mirror and close the shutter, thereby stopping the shooting of the movie. The auto-focusing during the live view shooting is performed by the body CPU 50 on the basis of the movie data output from the image pickup device 16 (contrast AF).

The lens barrel 7 depicted in FIG. 1 includes an optical lens group including the auto-focusing (AF) lens 24, a focal distance encoder 74, a distance encoder 72, a driving motor 76 for driving the AF lens 24, the lens CPU 80, the lens contact 34, etc.

The lens CPU 80 has a function of communicating with the body CPU 50 and a function of controlling the electronic components mounted on the lens barrel 7. For example, the lens CPU 80 outputs the focal distance information, the subject distance information, and the like to the body CPU 50 via the lens contact 34. Moreover, the lens CPU 80 receives the AF information, the movie start/stop information, the release information, and the like from the body CPU 50. The lens CPU 80 can control the driving motor 76 of the AF lens 24, etc. on the basis of these pieces of information.

The focal distance encoder 74 calculates the focal distance from the positional information of a zoom lens group, which is not shown, and outputs the calculation result to the lens CPU 80. The distance encoder 72 calculates the subject distance from the positional information of the focusing lens group including the AF lens 24, and outputs the calculation result to the lens CPU 80. The subject distance information is used for adjusting the flash light, which is not shown, for example.

As depicted in FIG. 1, the camera body 5 includes the voltage signal output circuit 28. The voltage signal output circuit 28 outputs voltage to a plurality of electrodes included in a dust-proof filter 18 in the image pickup device unit 15 on the basis of the control signal from the body CPU 50.

Based on the movie data created by the image pickup device 16, the face recognition process unit 51 of the body CPU 50 detects whether or not the face of a specific subject is included in the movie data. For detecting whether or not the face of a specific subject is included in the movie data, a known face recognition function such as template matching can be used.

Figure 3:
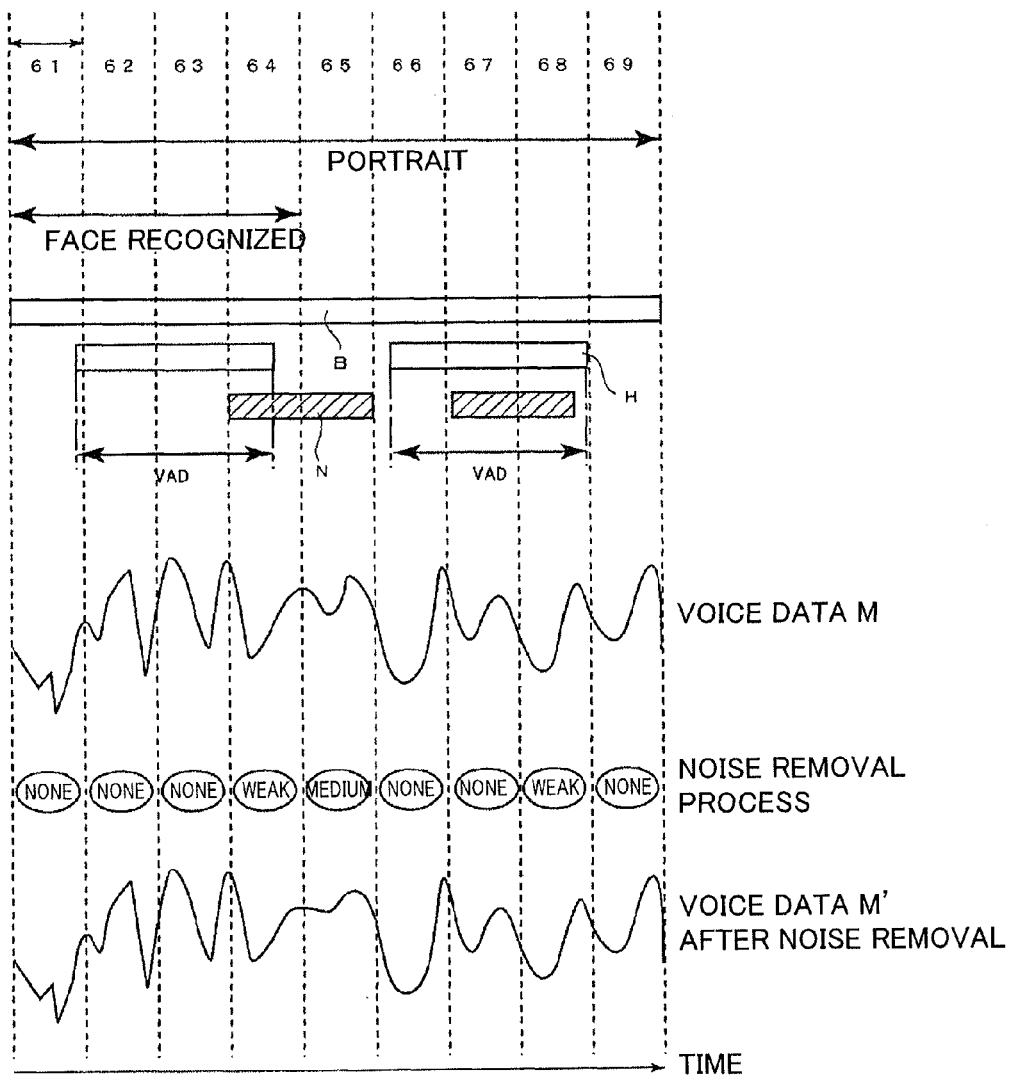
FIG. 3 is a conceptual diagram representing sound generated during shooting of the movie with the camera depicted in FIG. 1 and a sound signal detected by the body CPU along a time axis.

With reference to FIG. 3, the case in which sound B is generated at all times during the shooting of the movie is described. Note that the body CPU 50 acquires the image data for each frame (for example, 1 ms) from the image pickup device 16 and generates the continuous movie data. FIG. 3 representatively depicts continuous image frames 61 to 69 only and conceptually describes the sound B generated in the frames 61 to 69.

Figure 4:
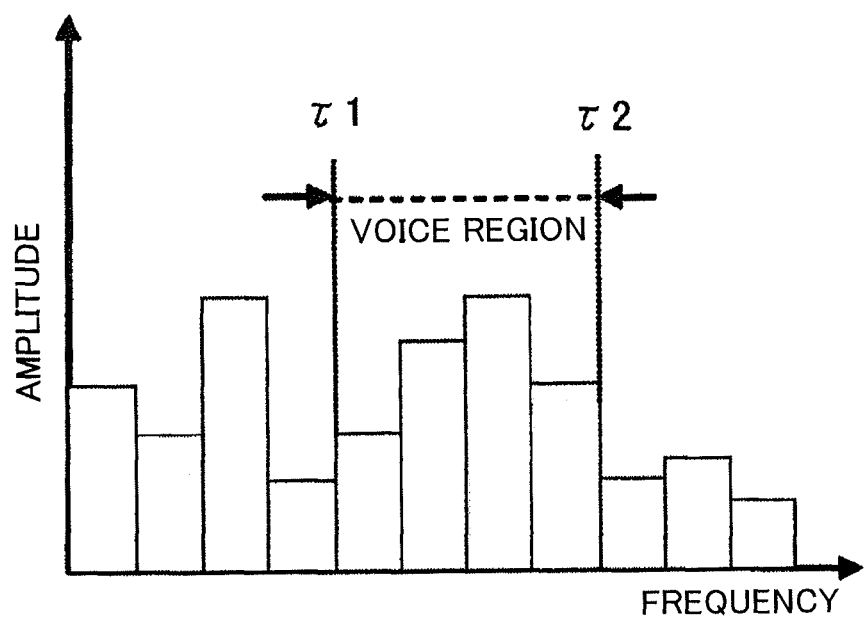
FIG. 4 is a conceptual diagram of one example of voice section detection.

The sound B might include voice H produced by a specific subject and noise N. The microphone 43 depicted in FIG. 1 collects such sound B, and outputs the sound B as voice data M, which is conceptually depicted in FIG. 3, to the body CPU 50. The VAD process unit (voice detection unit) 52 depicted in FIG. 1 extracts the power information from the voice data M, and based on the extracted frequency information, detects a section from the start to the end of a frequency band higher than a first lower-limit threshold as a voice section where voice of a person or an animal is produced, as conceptually depicted in FIG. 4.

The lens CPU 80 depicted in FIG. 1 drives the AF lens 24 by outputting the AF driving signal to the AF driving motor 76. The noise detection unit 53 of the body CPU 50 is connected to the lens CPU 80 via the lens contact 34 and therefore can detect the AF driving signal directly. Upon the detection of the AF driving signal by the noise detection unit 53, the noise reduction process unit 54 performs the noise reduction process as described below.

Figure 5:
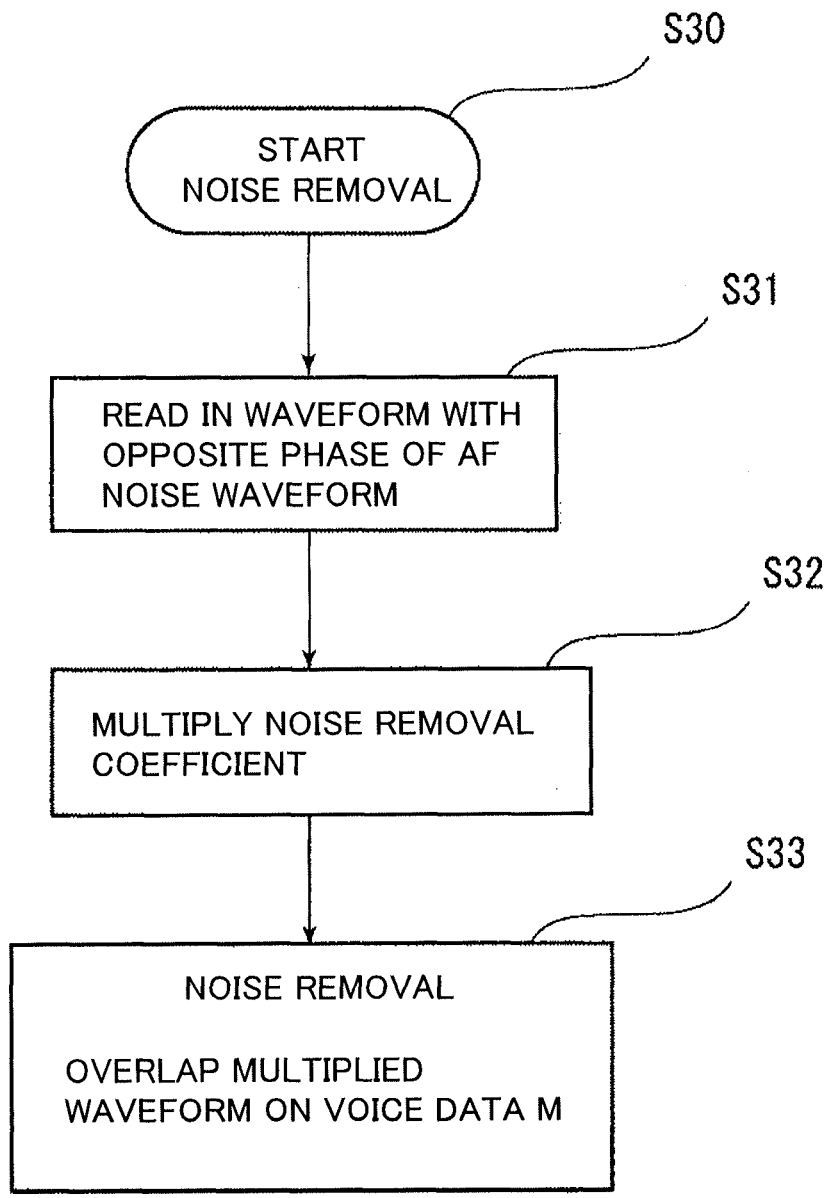
FIG. 5 is a flowchart of a noise reduction process.

The reduction of the noise (specific AF driving noise in this embodiment) by the noise reduction process unit 54 is performed based on the flowchart of FIG. 5. In Step S30, the noise reduction process unit 54 reads in a noise reduction start signal; then, in Step S31, the noise reduction process unit 54 reads in the waveform with an opposite phase of the AF noise which is stored in the EEPROM 46 in advance, for example. Next, in Step S32, the waveform with the opposite phase of the AF noise is multiplied by a noise reduction coefficient (a normal-level reduction coefficient or a low-level reduction coefficient, which is described later). Next, in Step S33, the waveform obtained as a result of the multiplying in Step S32 is added to the voice data M depicted in FIG. 3, thereby reducing the noise.

When the face recognition process unit 51 has detected the face of a specific subject, the noise reduction performance change unit 55 sets the noise reduction coefficient by the noise reduction process unit 54 to be small. In other words, the noise reduction coefficient by the noise reduction process unit 54 is set to the low-level reduction coefficient. Alternatively, when any scene mode signal of Portrait, Child, and Pet has been acquired from the shooting mode changing switch 44, the noise reduction performance change unit 55 sets the noise reduction coefficient by the noise reduction process unit 54 to the low-level reduction coefficient.

Figure 2:
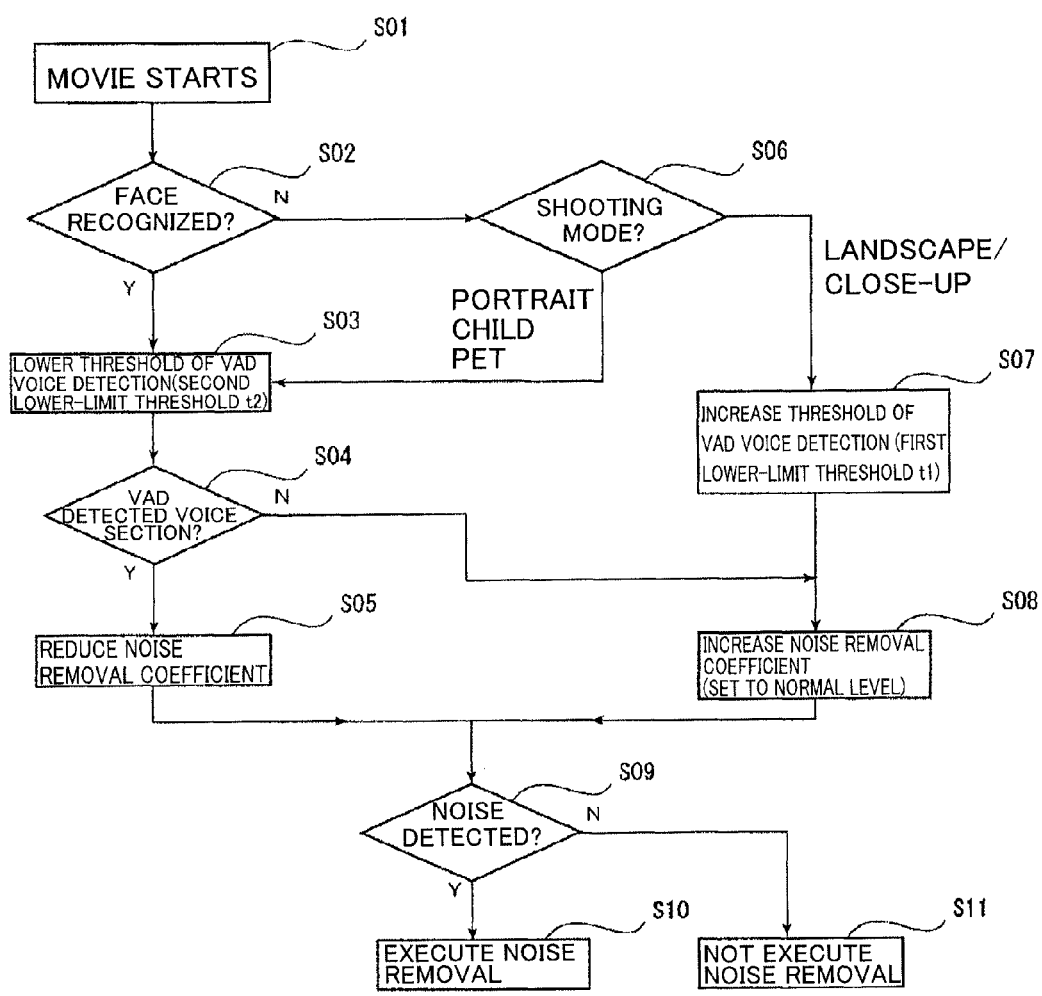
FIG. 2 is a flowchart of a process when a body CPU detects sound during shooting of a movie with the camera depicted in FIG. 1.

Next, based on the flowchart of FIG. 2, the operation of the body CPU 50 depicted in FIG. 1 is described. As depicted in FIG. 2, when the body CPU 50 has received the start signal of shooting the movie in Step S01, the body CPU 50 determines whether or not the face of a specific subject is included in the movie data at the start of the voice data M corresponding to a certain movie frame in Step S02. In other words, if the body CPU 50 has determined that the movie data include the face of the specific subject, the process proceeds to Step S03.

In Step S03, the lower-limit threshold of the frequency to be the boundary of the voice section detected by the VAD process unit 52 is lowered to be a second lower-limit threshold t2; further, in Step S04, the body CPU 50 determines whether or not the voice data M are in the voice section (voice section VAD depicted in FIG. 3) at the timing of the boundary between the frames corresponding to the frames constituting the movie. If the body CPU 50 has determined that the voice data M are in the voice section, the process proceeds to Step S05. In Step S05, the body CPU 50 causes the noise reduction performance change unit 55 to set the noise reduction coefficient to be small (low-level reduction coefficient). Note that if the body CPU 50 has determined that the voice data M are out of the voice section in Step S04, the process proceeds to Step S08 (described later).

Next, in Step S09, the body CPU 50 determines whether or not the noise has been detected. The process proceeds to Step S10 if the body CPU 50 has detected the noise at the start of the voice data M corresponding to a certain movie frame, and in that movie frame, the noise reduction process is performed on the voice data M depicted in FIG. 3 at the aforementioned low-level reduction coefficient. The process proceeds to Step S11 if the body CPU 50 has not detected the noise at the start of the voice data M corresponding to a certain movie frame in Step S09, and in that movie frame, the noise reduction process is not performed.

The process proceeds to Step S06 if the body CPU 50 has determined that the movie data do not include the face of a specific subject in Step S02. In Step S06, the body CPU 50 detects the signal input from the shooting mode changing switch 44, and determines whether or not the mode is any of Portrait, Child, and Pet. The process proceeds to Step S03 if the body CPU 50 has determined that the shooting mode is any of Portrait, Child, and Pet.

The process proceeds to Step S07 if the body CPU 50 has determined that the shooting mode is Landscape or Close-up in Step S06, and the body CPU 50 sets the lower-limit threshold of the frequency to be the boundary of the voice section in the VAD process unit 52 to a first lower-limit threshold t1. In Step S07, the body CPU 50 does not need to detect the voice section VAD. Next, proceeds to Step S08, the body CPU 50 causes the noise reduction performance change unit 55 to set the noise reduction coefficient to the normal state (normal-level reduction coefficient).

Next, proceeds to Step S09, the body CPU 50 determines whether or not the noise has been detected. The process proceeds to Step S10 if the body CPU 50 has detected the noise at the start of the voice data M corresponding to a certain movie frame, and in that movie frame, the noise reduction process is performed on the voice data M depicted in FIG. 3 at the aforementioned normal-level reduction coefficient. The process proceeds to Step S11 if the body CPU 50 has not detected the noise at the start of the voice data M corresponding to a certain movie frame in Step S09, and in that movie frame, the noise reduction process is not performed.

In this manner, for example, by setting the lower-limit threshold of the frequency to be the boundary of the voice section to the second lower-limit threshold t2 in Step S03, the voice of a person or an animal can be collected for sure. At the start of the voice data M corresponding to a certain movie frame, the body CPU 50 performs the aforementioned operation (any of performing the noise reduction at the low-level reduction coefficient, performing the noise reduction at the normal-level reduction coefficient, and not performing the noise reduction) on the voice data M corresponding to the certain frame. As shown "weak" in FIG. 3 when the noise reduction is performed at the low-level reduction coefficient, as shown "middle" when the noise reduction is performed at the normal-level reduction coefficient, and as shown "middle" when the noise reduction is not performed, as a result of performing the noise reduction process on the voice data M, the body CPU 50 generates voice data M' after the noise reduction as depicted in FIG. 3 (the voice data M' is conceptually shown).

Specifically, at the start of the frame 61 in FIG. 3, the body CPU 50 has detected neither the voice of the specific subject nor the noise in the voice data M corresponding to the frame 61; therefore, the noise reduction process is not performed. In the voice data M corresponding to the frames 62 and 63, the body CPU 50 has detected the voice of the specific subject but not detected the noise at the start of the frames 62 and 63; therefore, the noise reduction process is not performed. In the voice data M corresponding to the frame 64, the body CPU 50 has detected the voice of the specific subject and moreover detected the noise at the start of the frame 64; therefore, the effect of the noise reduction is weakened to prevent the voice of the specific subject from being deteriorated.

In the voice data M corresponding to the frame 65, the body CPU 50 has not detected the voice of the specific subject but detected the noise at the start of the frame 65; therefore, the effect of the noise reduction is set to the normal level to perform the noise reduction process. In the voice data M corresponding to the frame 66, the body CPU 50 has detected neither the voice of the specific subject nor the noise at the start of the frame 66; therefore, the noise reduction process is not performed. In the voice data M corresponding to the frame 67, the body CPU 50 has detected the voice of the specific subject but not detected the noise at the start of the frame 67; therefore, the noise reduction process is not performed.

In the voice data M corresponding to the frame 68, the body CPU 50 has detected the voice of the specific subject and moreover detected the noise at the start of the frame 68; therefore, the effect of the noise reduction is weakened to prevent the voice of the specific subject from being deteriorated. In the voice data M corresponding to the frame 69, the body CPU 50 has detected neither the voice of the specific subject nor the noise at the start of the frame 69; therefore, the noise reduction process is not performed.

In the camera 3 and the noise reduction method of this embodiment, the image pickup device 16 shoots the movie and the microphone 43 converts the sound B produced during the shooting of the movie into the sound signal M. This sound B might include the noise N. The noise detection unit 53 detects whether or not the noise N is generated; if the noise N is detected, the noise reduction process unit 54 reduces the noise signal corresponding to the noise N from the sound signal M.

On the other hand, the VAD process unit 52 detects a non-noise signal. The non-noise signal refers to the voice of a person or an animal, music, and the like, and all the voice signals corresponding to the frequency band of at least the voice of a person. The sound signal including this non-noise signal is processed as a voice section, and the data not including the non-noise signal is processed as a non-voice section. The VAD process unit 52 utilizes the aforementioned known VAD. Based on the output signal of the shooting mode changing switch 44, the body CPU 50 predicts a specific subject or the body CPU 50 (face recognition process unit 51) recognizes the specific subject.

In this embodiment, when the body CPU 50 has determined that the shooting scene is any of Portrait, Child, and Pet (Step S06), it is possible to predict that the specific subject produces voice H. Alternatively, when the body CPU 50 has detected the face of the specific subject in the movie data (Step S02), it is possible to recognize the presence of the specific subject. In these cases, the noise reduction performance change unit 55 decreases the performance of the noise reduction process unit 54 for reducing the noise signal. In other words, the noise reduction performance change unit 55 makes the performance of the noise reduction process unit 54 for reducing the noise signal smaller when the noise signal is detected in the voice section than when the noise signal is detected in the non-voice section. Therefore, deterioration of the non-noise signal recorded in the voice section can be minimized. As a result, the voice of a person or an animal can be clearly recorded, thereby allowing the movie to be enjoyed more.

Conventionally, for suppressing the noise, a shooter deactivates the functions (AF, etc.) that would cause the noise during the shooting of a movie, in which case the range of expression in the shooting is narrowed. In this embodiment, however, a shooter can take advantage of these functions to increase the range of expression in the shooting.

A program of this embodiment allows a computer to operate the aforementioned units to process the movie data obtained in advance. A memory medium of this embodiment has a program recorded therein, the program allowing a computer to operate the aforementioned units to process the image data obtained in advance. Therefore, when the movie data obtained in advance are later edited on a computer, the deterioration of the non-noise signal in the voice section can be minimized. For example, even though a camera for shooting a movie data does not have a face recognition function, etc., the voice of a person or an animal can be clearly recorded with the program and the memory medium of this embodiment by minimizing the deterioration of the non-noise signal in the voice section.

The effect of reducing the noise signal is in proportion to the noise reduction coefficient. The noise reduction coefficient is varied between the normal-level reduction coefficient and the low-level reduction coefficient depending on whether or not a specific subject is predicted or recognized by the body CPU 50. Therefore, the magnitude of the effect of reducing the noise signal can be changed without complicated calculation.

In particular, when the body CPU 50 has predicted or recognized a specific subject, the reduction effect of the noise signal can be decreased (low-level reduction coefficient) and the voice of a person or an animal can be clearly recorded by minimizing the deterioration of the non-noise signal in the voice section. On the contrary, when the body CPU 50 has not predicted or recognized the specific subject, the reduction effect of the noise signal can be increased (normal-level reduction coefficient) as compared with the case of the low-level reduction coefficient, so that the noise signal can be reduced as appropriate in the non-voice section.

In this embodiment, the face recognition process unit 51 can recognize the presence of a face of the subject effectively by using the known face recognition function. While the face recognition process unit 51 recognizes presence of the face of the subject, it is highly likely that the subject speaks; therefore, the noise reduction performance change unit 55 decreases the performance of reducing the noise signal, so that the deterioration of the non-noise signal in the voice section can be minimized and the voice of a person or an animal can be clearly recorded.

When a shooter shoots a movie by selecting any of the shooting modes of Portrait, Child, Pet, etc., it is highly likely that a specific subject speaks. Therefore, while any of these scenes is selected, the body CPU 50 predicts that the specific subject produces voice H and the noise reduction performance change unit 55 decreases the performance of reducing the noise signal. Thus, the deterioration of the non-noise signal in the voice section can be minimized and the voice of a person or an animal can be clearly recorded. Meanwhile, while a shooter shoots a movie by selecting any of the shooting modes of Landscape, Close-up, etc., the subject determination unit 50 predicts that the shooter does not intend to record the speech of the specific subject. Therefore, while any of these scene modes is selected, the noise reduction performance change unit 55 sets the performance of reducing the noise signal to the normal state. Accordingly, the detected noise signal can be effectively reduced.

The noise detection unit 53 may detect the noise N by detecting at least the auto-focusing driving signal. Alternatively, the noise detection unit 53 may detect the noise N by detecting at least one of the auto-focusing, the shake correction, and zooming driving signals. A noise generation source and the noise detection unit 53 may be connected directly. During the driving of the auto-focusing, the shake correction, and zooming, etc., the noise detection unit 53 may detect these driving signals. In this case, the noise N caused by the driving can be detected for sure.

The VAD process unit (voice detection unit) 52 detects the voice signal from the sound signal M in the range from the lower-limit threshold to the upper-limit threshold of the frequency of the sound signal M. If the body CPU 50 (face recognition process unit 51) has recognized a specific subject or the body CPU 50 has determined the shooting scene is any of Portrait, Child, and Pet, the VAD process unit 52 may lower the lower-limit threshold from the first lower-limit threshold to the second lower-limit threshold so as to increase the range of detecting the voice signal. If the body CPU 50 (face recognition process unit 51) has not recognized the specific subject or if the body CPU 50 has determined that the shooting scene is any of Landscape, Close-up, etc., the VAD process unit 52 may set the lower-limit threshold to the first lower-limit threshold.

If the subject determination units 50 and 51 have predicted or recognized the specific subject (person or animal) using the known VAD, the voice of a person or an animal can be detected more clearly by increasing the range of detecting the voice signal.

It is described that the noise reduction process is not performed in the frame 67 in FIG. 3; however, the noise reduction process may be performed at the timing at which the body CPU 50 detects the AF driving signal even in the middle of the frame 67.

Second Embodiment

Figure 6:
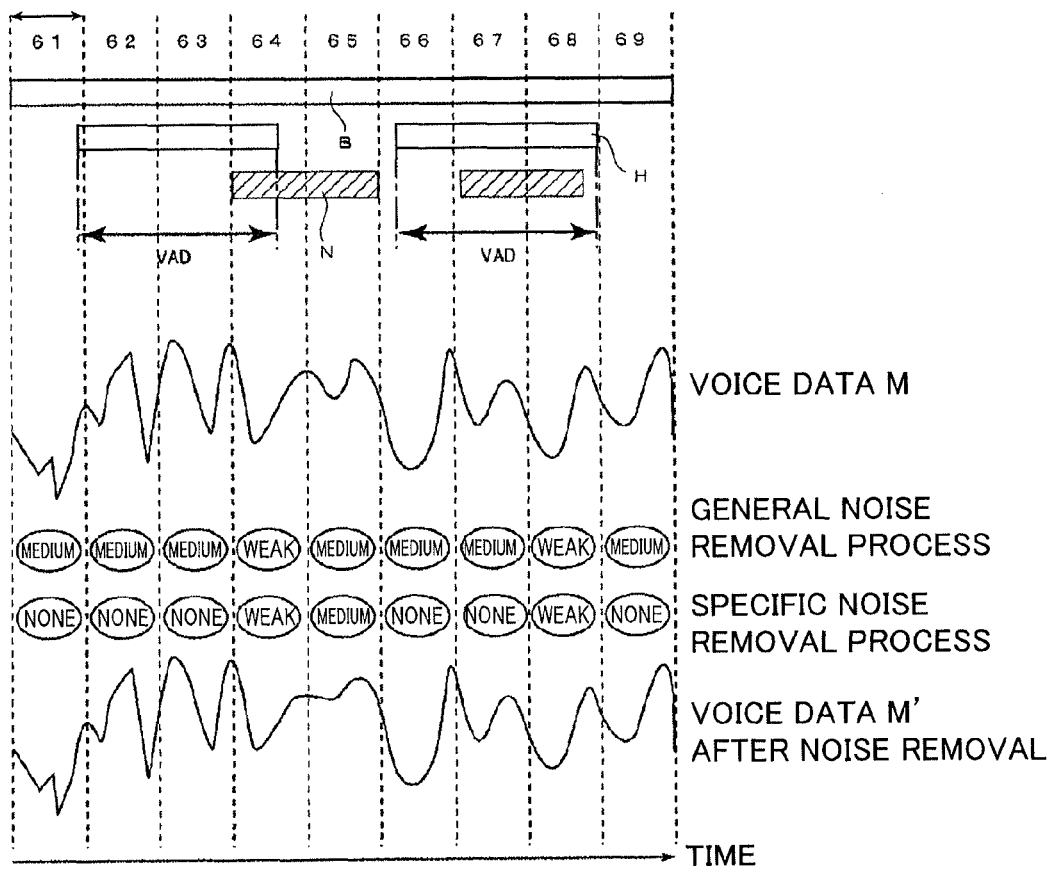
FIG. 6 is a conceptual diagram representing process levels when a general noise reduction process is performed by a noise reduction method of a second embodiment of the present invention, and the waveform after the process.

The first embodiment describes the case, for example, where the noise reduction process is not performed at all like in the frame 61 depicted in FIG. 3; however, in this embodiment, the reduction of general noise (for example, sound of a vehicle engine or sound of wind) other than the noise (specific noise) such as the AF noise is performed also in the frame 61, for example as depicted in FIG. 6. The EEPROM 46 depicted in FIG. 1 stores a program for reducing the general noise other than the specific noise in addition to a program for reducing the specific noise. The other points are similar to the first embodiment, and the redundant description is not made.

It is considered that the sound B depicted in FIG. 6 includes the general noise. For example, in the voice data M corresponding to the frame 61, the body CPU 50 has not detected the voice of a specific subject but detected the general noise at the start of the frame 61; therefore, a general noise reduction process is performed at the normal-level reduction coefficient.

For example, in the voice data M corresponding to the frame 64, the body CPU 50 has detected the voice of a specific subject and moreover detected the specific noise at the start of the frame 64; therefore, the effect of the noise reduction is weakened to prevent the voice of the specific subject from being deteriorated.

Moreover, for example, the body CPU 50 has not detected the voice of a specific subject but detected the general noise at the start of the frame 65. Further, the body CPU 50 has detected the specific noise. In this case, the reduction of the specific noise is performed at the normal-level reduction coefficient.

In this embodiment, not just the specific noise but also the general noise can be reduced.

Although the above embodiment has described the camera having the mirror mechanism, the camera may alternatively have a system without the mirror mechanism.

The target to be detected as noise by the noise detection unit is not particularly limited; the noise detection unit can detect the sound of a motor for driving a shake correction lens, the passing sound of car (noise), the operation sound of an operation button of a camera, and the like. The program for reducing noise and the units used for the voice detection are not limited to those in the above embodiment, and a general program for noise detection or a general program for voice detection can alternatively be used.

Third Embodiment

A third embodiment of the present invention is described hereinafter with reference to the drawings, etc. epicting a configuration of a camera of the third embodiment.

Figure 7:
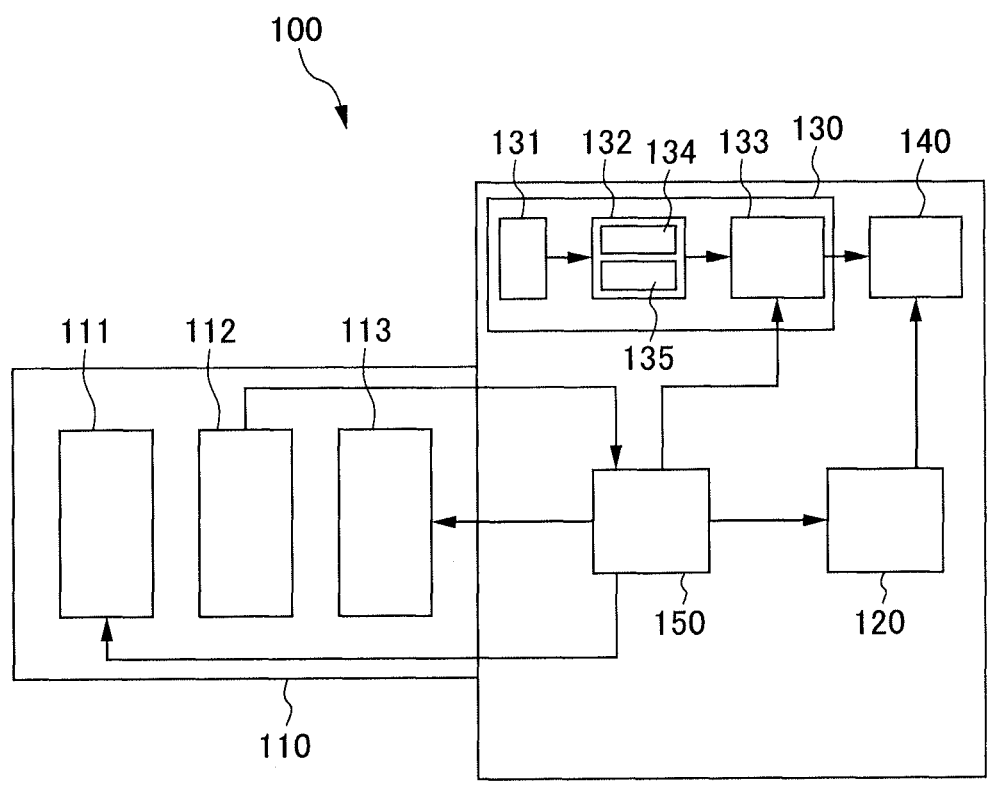
FIG. 7 is a block diagram of a camera configuration according to a third embodiment of the present invention.

As depicted in FIG. 7, a camera 100 includes: a lens barrel 110; an image process unit 120 for picking up and performing A/D conversion of a subject image having passed the lens barrel 110 and for generating image data through image processing; a sound information process unit 130 for performing A/D conversion of the collected sound information and for performing a noise reduction process; a recording unit 140 for recording the image data obtained in the image process unit 120 and a voice signal obtained in the sound information process unit 130; and a CPU 150.

The lens barrel 110 includes: a VR unit 111, an AF encoder 112, and an AF driving motor 113, those are including a focal point adjusting lens (hereinafter, an AF (auto-focus) lens), a shake correction lens (hereinafter, a VR (vibration reduction)

lens), a zoom lens, a zoom lens drive unit, a zoom encoder, an image blur correction unit, and the like.

The AF encoder 112 detects the position of the AF lens of the optical system, and outputs the detection result to the CPU 150. The AF driving motor 113 receives a driving control signal for controlling the position of the AF lens from the CPU 150, and the position of the AF lens is controlled based on the driving control signal.

The CPU 150 controls the lens barrel 110 in accordance with the set imaging condition (for example, aperture value or exposure value). The CPU 150 generates the driving control signal for driving the zoom lens drive unit and the AF driving motor 113, and outputs the signal to the zoom lens drive unit and the AF driving motor 113.

The sound information process unit 130 includes a microphone 131 as a sound collection device, a sound signal process unit 132 for processing the sound information which has been collected and subjected to the A/D conversion, and a noise reduction process unit 133.

The sound signal process unit 132 includes a voice section detection unit 134 for detecting the voice section from the sound information collected with the microphone 131, and a noise timing detection unit 135 for detecting the timing at which the operation noise is generated, on the basis of the operation information of the AF driving motor 113.

The voice section detection unit 134 distinguishes between the section including the voice signal (voice section) and the other section (non-voice section) from the sound information collected with the microphone 131 on the basis of the peak value of the autocorrelation function.

The summary of the detection of the voice section by the voice section detection unit 134 is as follows.

Figure 8:
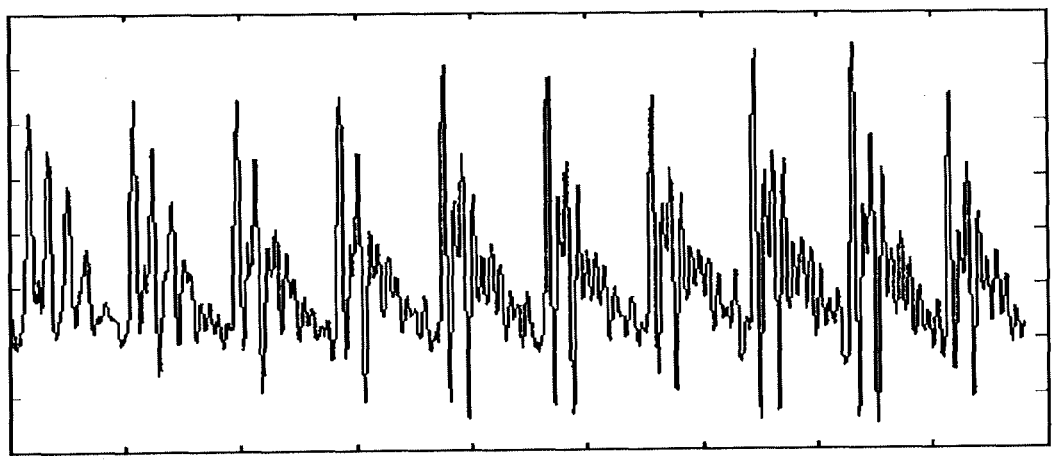
FIG. 8 is a voice waveform diagram.

FIG. 8 depicts the voice waveform. The autocorrelation function obtained by cutting out a part of this voice waveform of FIG. 8 is represented by the waveform of FIG. 9. This voice waveform has a property (harmonic property) that the peak concentrates on the fundamental frequency corresponding to the voice, i.e., the frequency of vocal cord vibration and the frequency range corresponding to the harmonic thereof. Utilizing this harmonic property, it is possible to distinguish between the voice and the non-voice depending on the peak value of the autocorrelation function.

Figure 10A:
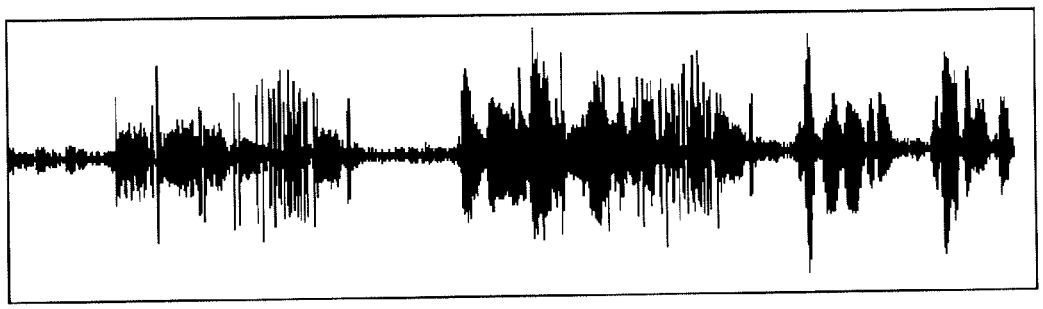
FIG. 10A depicts the output waveform from a microphone in one example of detection of the voice section utilizing the autocorrelation function.
Figure 10B:
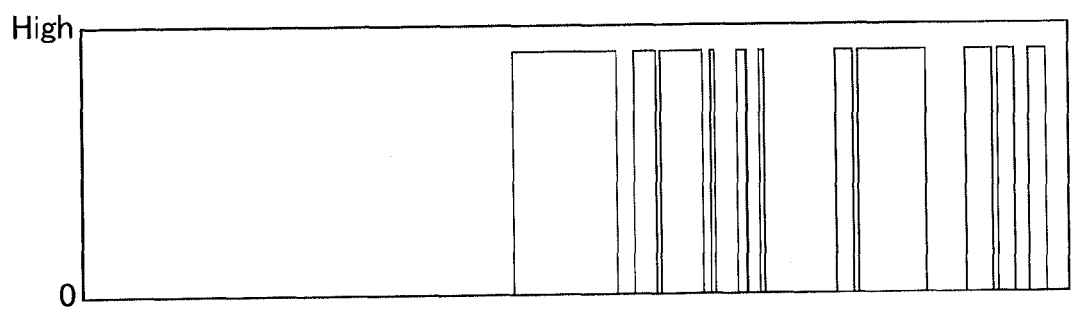
FIG. 10B depicts the waveform whose part equal to or more than the threshold corresponding to the peak of the autocorrelation function is denoted as High in one example of detection of the voice section utilizing the autocorrelation function.

FIG. 10A and FIG. 10B depict one example in which the voice section is detected using the autocorrelation function. FIG. 10A depicts the output waveform of the microphone 131; the AF noise is generated in the former half and the voice and the AF noise are generated in the latter half. The autocorrelation function is obtained relative to the output waveform as depicted in FIG. 10A, and the threshold is set to the peak of this autocorrelation function; when the part over the threshold is denoted by High, the waveform as depicted in FIG. 10B is obtained. Thus, the presence of the voice section that matches the voice position in the latter half of the output waveform can be detected.

The noise timing detection unit 135 detects the timing at which the operation noise is generated from the operation information of the AF driving motor 113. The generation timing of the operation noise is detected (estimated) by the noise timing detection unit 135 using the output of the AF encoder 112 and the AF driving command for ordering the CPU 150 to output the driving control signal for the AF driving motor 113.

The details of the detection of the generation timing of the operation noise by the noise timing detection unit 135 are as follows.

As depicted in FIG. 11, if the AF driving motor 113 is operated by the output of the AF driving command, the operation noise is generated continuously from the operation start time t1 of the AF driving motor 113, which corresponds to the output time of the AF driving command, to the operation end time t3. The microphone 131 collects the sound information in which the operation noise is overlapped on the record target sound such as the voice of a subject, and the collected sound information is output from the microphone 131.

On this occasion, the AF encoder 112 might output at the time t2 which is later than the operation start time t1 of the AF driving motor 113 due to, for example, the influence of the backlash occurring in the gear train of the AF driving system. In view of this, the noise timing detection unit 135 detects' the time from the output time t1 of the AF driving command to the output stop t3 of the AF encoder 112 as the generation timing of the operation noise, and detects the other time as the non-noise timing.

Although the signal actually output from the microphone 131 during the AF operation is the signal in which the operation noise is overlapped on the target sound, only the operation noise is shown in FIG. 11 for simplifying the description.

The noise reduction process unit 133 reduces, among the operation noise shown in FIG. 11, the impact sound noise which is generated at the start of the AF operation and at the end of the AF operation. The noise reduction process unit 133 acquires a first frequency spectrum in a window X before the generation of the operation noise and a second frequency spectrum in a window Y after the generation of the operation noise depicted in FIG. 11. The acquired first frequency spectrum and second frequency spectrum are compared, and if the second frequency spectrum is larger than the first frequency spectrum, the second frequency spectrum is replaced by the first frequency spectrum, thereby performing a first noise reduction process.

Here, if the voice section detection unit 134 has detected the voice section, the spectrum of predetermined frequency (for example, 4000 Hz) or less is maintained without replacement; if the unit 134 has detected the non-voice section, the spectrum of predetermined frequency or less, which is lower than the above frequency (for example, 500 Hz), is maintained without replacement. In other words, the upper limit of the frequency for maintaining the spectrum in the detection of the voice section is set to, for example, 4000 Hz and the upper limit of the frequency for maintaining the spectrum in the detection of the non-voice section is set to, for example, 500 Hz; thus, a first impact sound noise reduction process is performed when the voice section is detected and the process is weaker than when the non-voice section is detected.

The noise reduction process unit 133 estimates the noise from the frequency spectrum in the case the non-voice section is detected by the voice section detection unit 134 and where an intensive impact sound noise reduction process is performed, and updates the estimated noise; then, the unit 133 subtracts the estimated noise from the frequency spectrum which has been subjected to the first impact sound noise reduction process, thereby performing a spectrum subtraction process for generating the frequency spectrum (second noise reduction process).

In addition to the above configuration, the sound information process unit 130 includes a process unit for dividing the sound information output from the microphone 131 for each predetermined section, weighting with a window function, and performing Fourier transform (FFT: Fast Fourier Transform) of the sound data for each section to convert the data into a frequency region. Moreover, the sound information process unit 130 includes a process unit for performing inverse Fourier transform (IFFT: Inverse Fast Fourier Transform) on the spectrum which is divided to the amplitude information and the phase information of the frequency region by the FFT process and which is subjected to the noise reduction process (spectrum subtraction process) using the amplitude information of the frequency region, so that the spectrum (sound information) after the noise reduction process is converted into a time region. These process units are not shown in the drawings.

Further, the noise reduction process unit 133 has a flooring function of correcting the spectrum if the spectrum has disappeared or has been drastically decreased after the second noise reduction process (spectrum subtraction process). In this flooring, the flooring spectrum generated based on the sound information in the case the noise timing detection unit 135 has detected the non-noise timing and the voice section detection unit 134 has detected the non-voice section is compared with the spectrum after the subtraction in the second noise reduction process. If the spectrum after the subtraction is less (spectrum intensity is lower) than the flooring spectrum, the sound information (spectrum) having employed the flooring spectrum is generated and subjected to the IFFT process.

However, if the spectrum after the subtraction is more (spectrum intensity is higher) than the flooring spectrum, the flooring process may be either performed or omitted.

The flooring spectrum used for the flooring function is updated using the sound information in the case the noise timing detection unit 135 has detected the non-noise timing and the voice section detection unit 134 has detected the non-voice section. Thus, the flooring spectrum includes neither the operation noise spectrum nor the voice spectrum, and includes only background sound, and it is prevented that the voice, which originally does not exist, being included in the sound information after the noise reduction process due to the addition of the voice spectrum during the flooring process.

Figure 13:
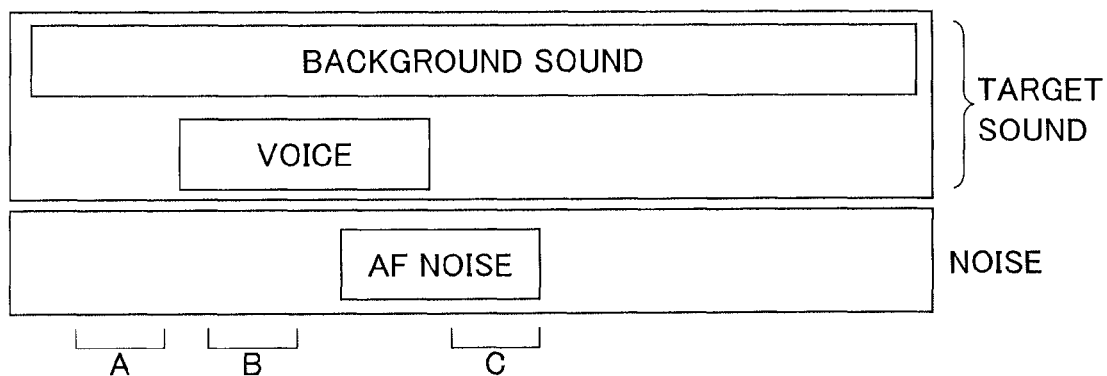
FIG. 13 is a schematic diagram for describing a mode of first process target sound as a target of the noise reduction process.

Next, the operation of the noise reduction process (noise reduction method) in the camera 100 of this embodiment is described with reference to the drawings. FIG. 12 is a flowchart of the operation of the noise reduction process. FIG. 13 is a schematic diagram for describing the mode of first process target sound, which is the target of the noise reduction process.

(First Process Target Sound)

As depicted in FIG. 13, the first process target sound includes only background sound in the section A, background sound and voice (target sound) in the section B, and background sound and AF noise in the section C. The description is made of the flooring update and the operation of reducing the AF noise from the sound information collected with and output from the microphone 131 in the section C of the first process target sound depicted in FIG. 13.

(Step ST1)

First, the noise timing detection unit 135 starts the detection of the noise timing on the basis of the sound information output from the microphone 131.

Figure 14:
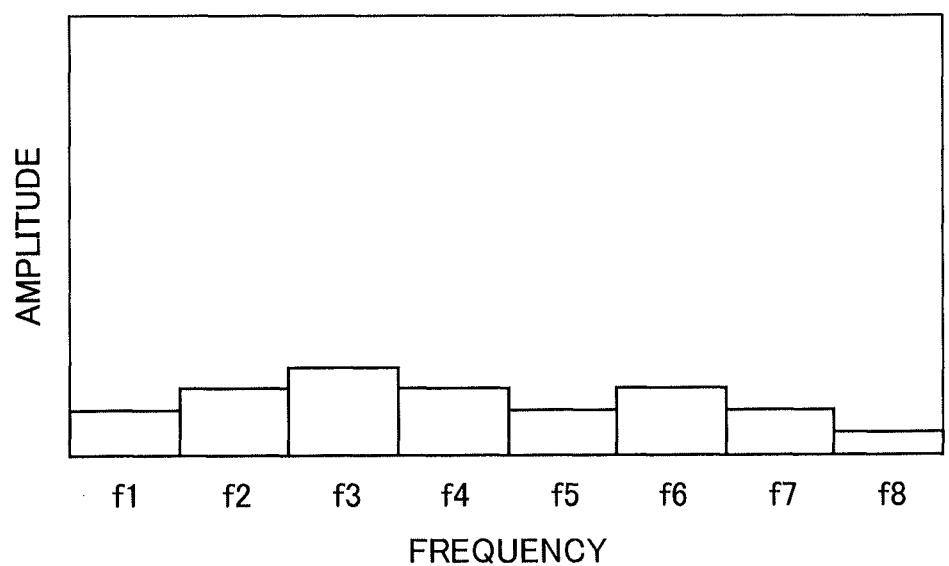
FIG. 14 depicts a spectrum of section A.
Figure 15:
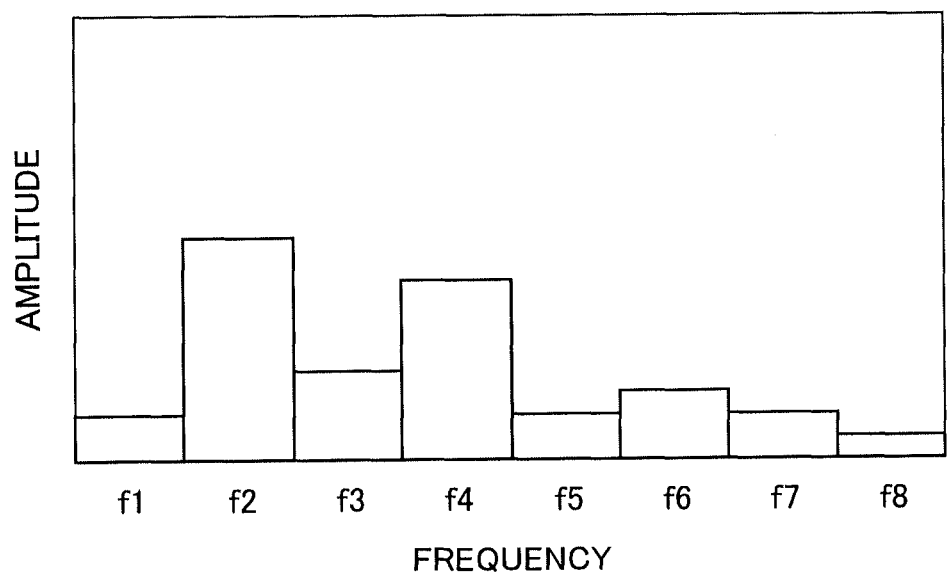
FIG. 15 depicts a spectrum of section B.

The section A and the section B of the sound information (spectrum) collected with the microphone 43 are depicted in FIG. 14 and FIG. 15, respectively.

(Step ST2)

Subsequently, the voice section detection unit 134 starts the detection of the voice section on the basis of the sound information output from the microphone 131.

(Step ST3)

The sound information output from the microphone 131 is subjected to the FFT process, thereby being divided into the phase information and the amplitude information of the frequency region.

(Step ST4)

Next, the noise timing detection unit 135 detects (determines) whether the timing is the generation timing of the operation noise or the non-noise timing (i.e., AF section or not).

(Step ST4, YES)

In Step ST4, the section C is determined as the generation timing of the operation noise (AF section, YES) and then the process proceeds to Step ST5.

(Step ST4, NO)

The sections A and B are determined as the non-noise timing, and the process proceeds to Step ST11.

(Step ST5)

In Step ST5, the voice section detection unit 134 detects (determines) whether the section is the voice section or the non-voice section. The section C is the non-voice section (NO); therefore, the process proceeds to Step ST7.

(Step ST7)

Figure 16:
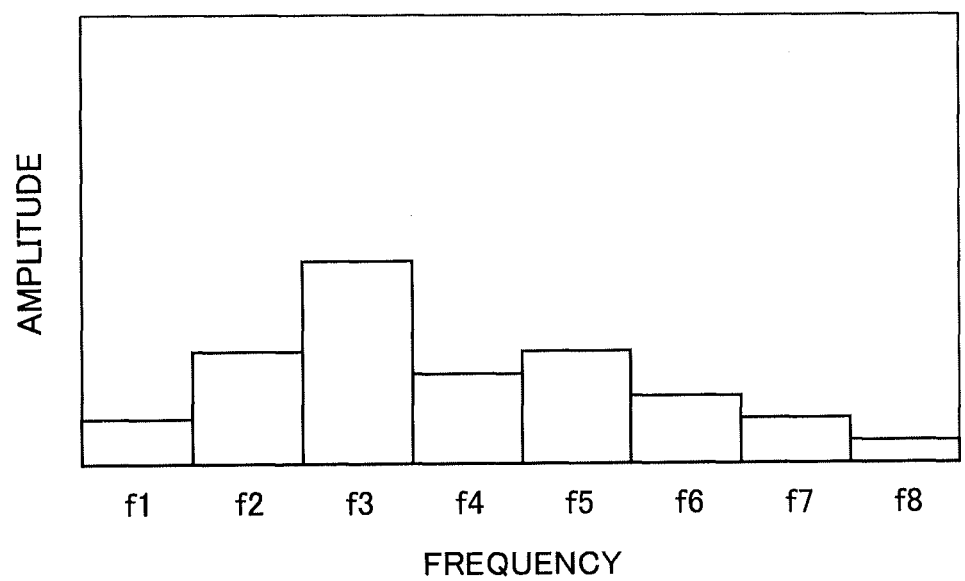
FIG. 16 depicts a spectrum of section C.

Here, if the AF operation start time and the AF operation stop time are included, the intensive impact sound noise reduction process, for example, maintaining the spectrum whose upper limit is less than or equal to predetermined frequency (for example, 500 Hz) without replacement, is performed, thereby providing the spectrum of FIG. 16 for the section C.

If the AF operation start time and the AF operation stop time are not included, it is determined that the impact sound time is not included; therefore, the impact sound noise reduction process is not performed.

(Step ST8)

Figure 17:
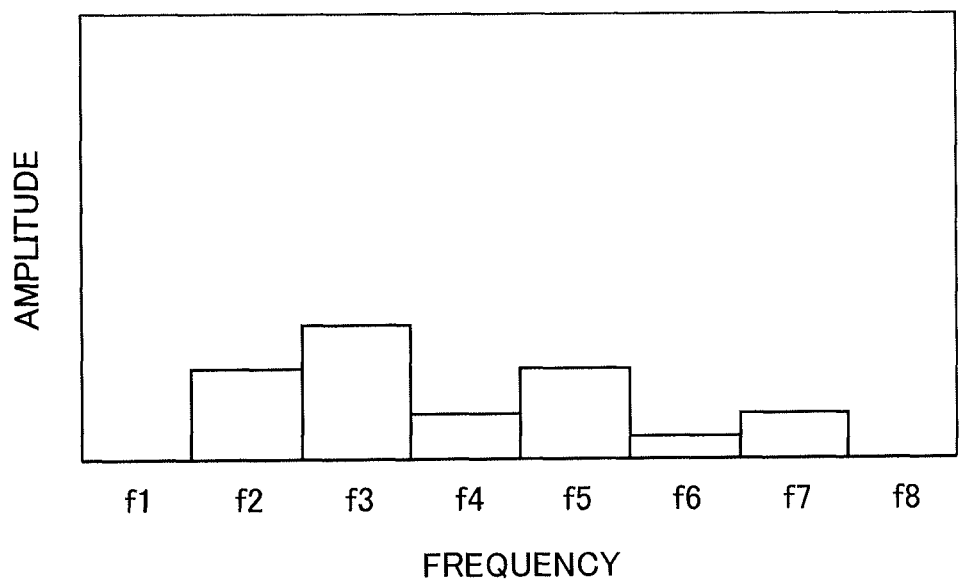
FIG. 17 depicts a spectrum of estimated noise.

Next, the noise in the spectrum (FIG. 16) obtained by the noise reduction process in Step ST7 is estimated and the estimated noise spectrum as depicted in FIG. 17 is output to Step ST9.

(Step ST9)

Figure 18:
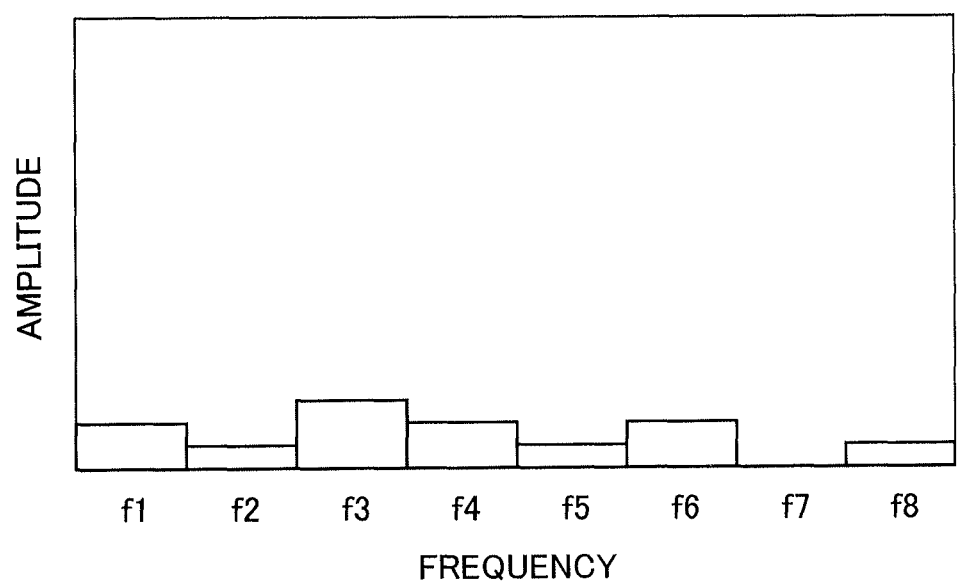
FIG. 18 depicts a spectrum obtained by subtracting the noise from the spectrum of the section C.

Subsequently, the spectrum subtraction process (second noise reduction process) is performed for subtracting the estimated noise spectrum (FIG. 17) obtained by the estimation in Step ST8 from the spectrum (FIG. 16) obtained by the impact sound noise reduction process in Step ST7, thereby providing the spectrum as depicted in FIG. 18.

(Step ST10)

Due to the second noise reduction process (spectrum subtraction process), the spectrum in FIG. 18 might be drastically decreased or even disappear; therefore, for dealing with this, the flooring for correcting the spectrum of FIG. 18 is performed.

Figure 19:
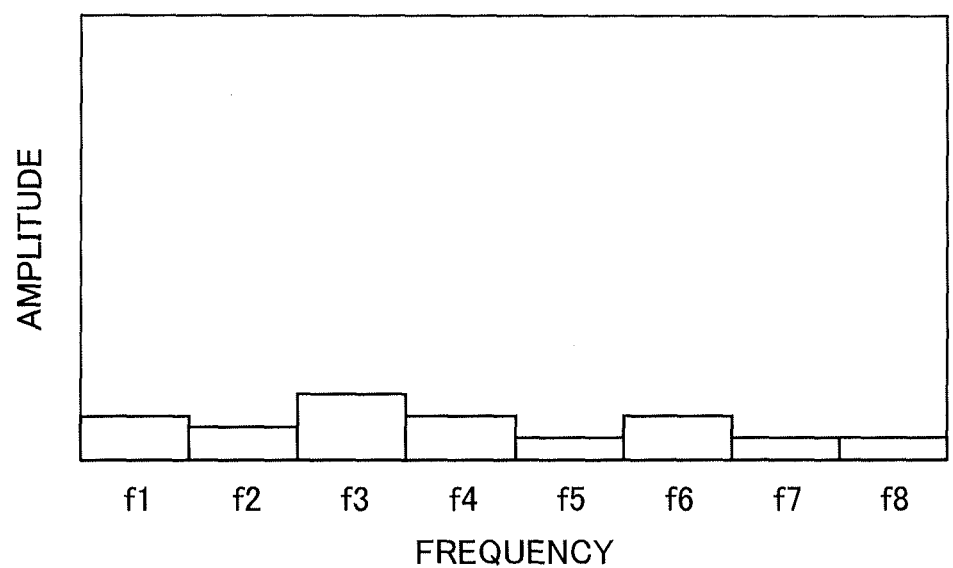
FIG. 19 depicts a spectrum after flooring in which a flooring spectrum A is used.

In this flooring, the magnitude of the spectrum of FIG. 18 is compared with that of the flooring spectrum serving as the reference. Then, the spectrum with higher intensity is employed to generate the spectrum depicted in FIG. 19. The flooring spectrum used here is, as later described, the flooring spectrum obtained from the section A.

(Step ST11)

The process returns to Step ST11, and here, the voice section detection unit 134 detects (determines) whether the section is the voice section or the non-voice section (section including background sound only). As a result, the section B is determined as the voice section (YES), and the process proceeds to Step ST13 without the noise reduction process, the spectrum subtraction, or the flooring. The section A is determined as the non-voice section (NO), and the process proceeds to Step ST12.

(Step ST12)

Figure 20:
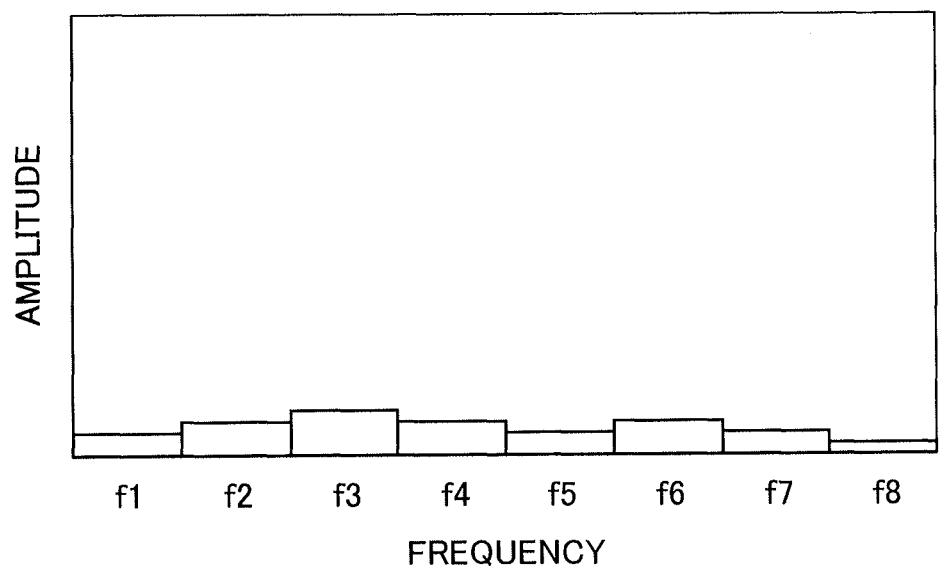
FIG. 20 depicts the flooring spectrum A.

In Step ST12, the amplitude of the spectrum at each frequency in the section A depicted in FIG. 14 in which only the background sound is generated is reduced to half, thereby providing the flooring spectrum as depicted in FIG. 20. This flooring spectrum (FIG. 20) is used in the flooring of Step ST10 as aforementioned, and the spectrum is updated to this flooring spectrum.

Figure 21:
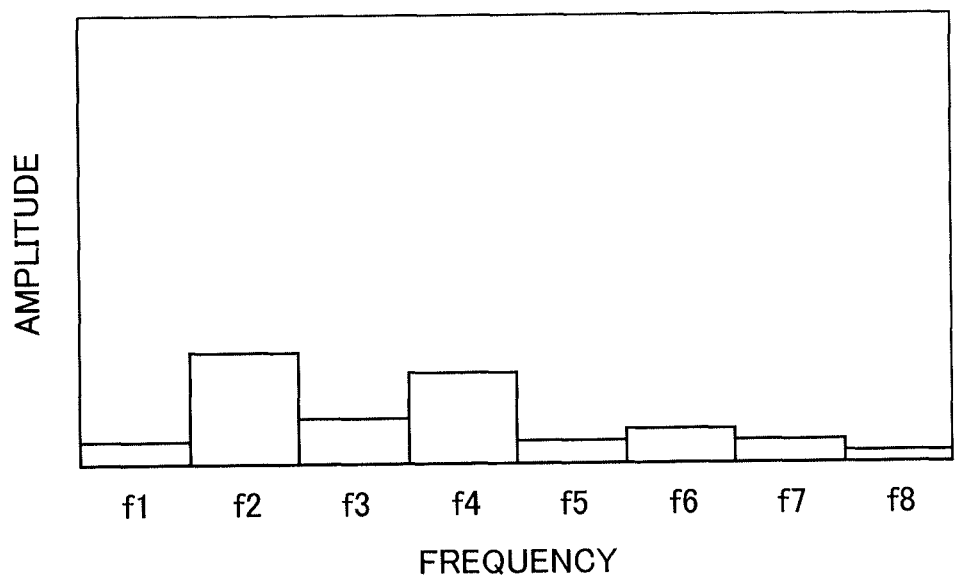
FIG. 21 depicts a flooring spectrum B.
Figure 22:
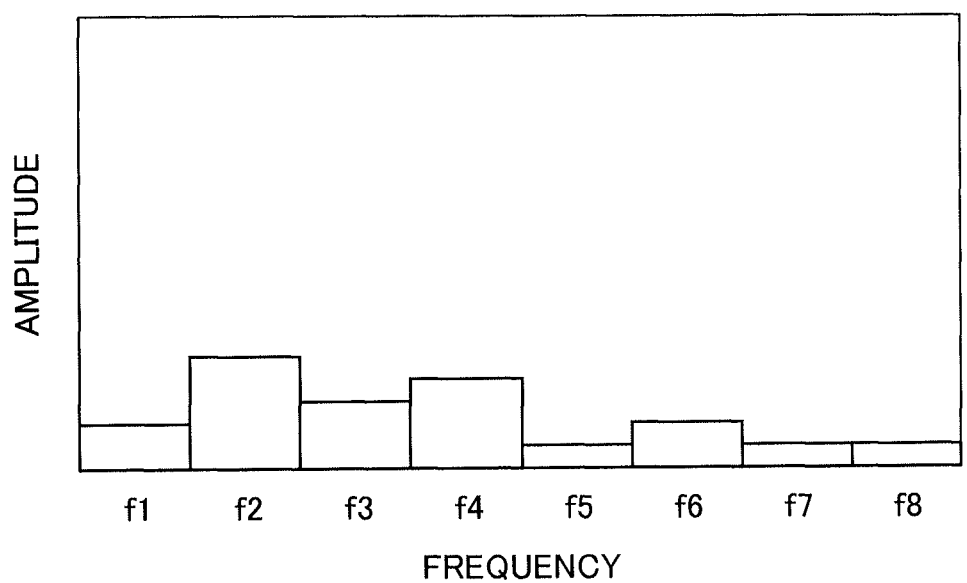
FIG. 22 depicts a spectrum after flooring in which the flooring spectrum B is used.

If the flooring is performed using the flooring spectrum of FIG. 21 obtained by reducing the amplitude of the spectrum at each frequency depicted in FIG. 15 of the section B to half, the spectrum as depicted in FIG. 22 is obtained. When the spectrum depicted in FIG. 22 is the spectrum of the section C, the components of the spectrum (especially f2 and f4) of voice included in the section B (FIG. 15) are also included, in which case the correct target sound cannot be obtained.

In this embodiment, however, the flooring spectrum (FIG. 20) used in the flooring does not include the spectrum of the voice and the operation noise. For this reason, it is possible to prevent the spectrum of the AF noise and the voice from being added in the flooring of Step ST10 and the operation noise or voice, which originally does not exist, from being generated in the sound information after the noise reduction process.
(Step ST13)

In the last Step ST13, the IFFT process is performed using the phase divided in Step ST3, so that the spectrum after the noise reduction process is converted into a time region and output to the recording unit 140.
(Second Process Target Sound)

Next, the description is made of the operation of the noise reduction process (noise reduction method) in the case of using second process target sound having a different mode from the first process target sound. Note that since the steps of the operation flow of the noise reduction process are approximately similar to those of the first process target sound, the description is mainly made of the different point of the process in each step.

Figure 23:
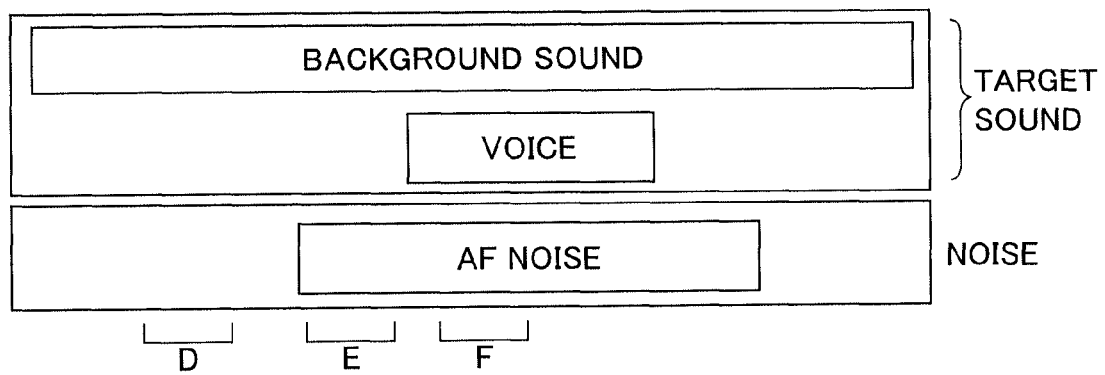
FIG. 23 is a schematic diagram for describing a mode of second process target sound as a target of the noise reduction process.

FIG. 23 is a schematic diagram for describing the mode of the second process target sound as the target of the noise reduction process. As depicted in FIG. 23, the process target sound includes only background sound in the section D, background sound and AF noise in the section E, and background sound, voice, and AF noise in the section F. The description is made of the flooring update and the operation of reducing the AF noise from the sound information collected with and output from the microphone 131 in the section E and the section F of the process target sound depicted in FIG. 23.

The description of Step ST1 to Step ST4 is omitted because the process is similar to that of the section C of the first process target sound.
(Step ST5)

The section F is determined as the voice section (YES) in Step ST5 and the process proceeds to Step ST6.
(Step ST6)

In Step ST6, if the AF operation start time and the AF operation stop time are included, the first impact sound noise reduction process, which is weak, is performed in which the spectrum whose upper limit is less than or equal to predetermined frequency (for example, 4000 Hz) is maintained without replacement.

If the AF operation start time and the AF operation stop time are not included, it is determined that the impact sound noise is not included; therefore, the impact sound noise reduction process is not performed.

The spectrum on which the first impact sound noise reduction process has been performed includes the voice spectrum components f2 and f4. This spectrum is not used for updating the estimated noise, and the process proceeds to Step ST9 for performing the spectrum subtraction process, which is the second noise reduction process.

Figure 24:
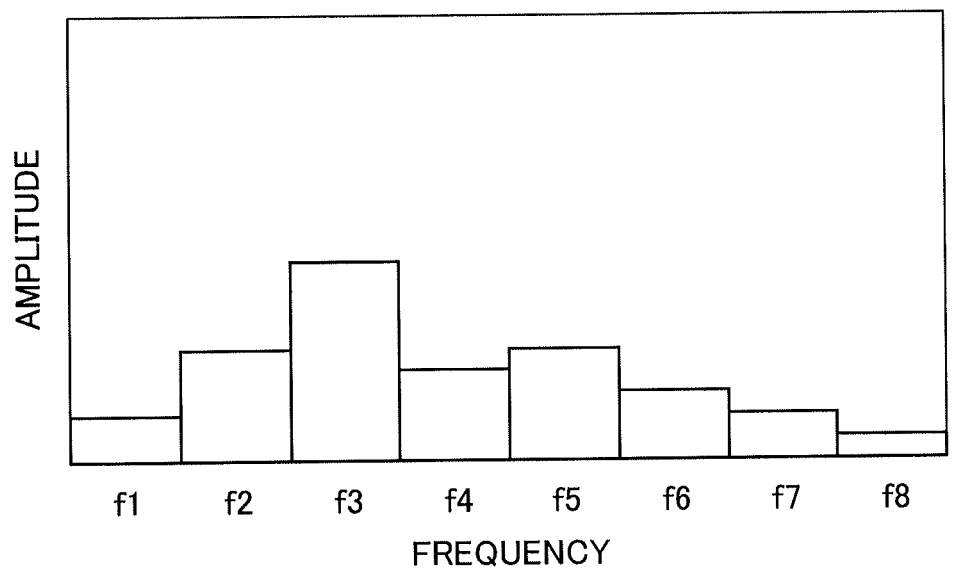
FIG. 24 depicts a spectrum of background sound and noise in section E.
Figure 26:
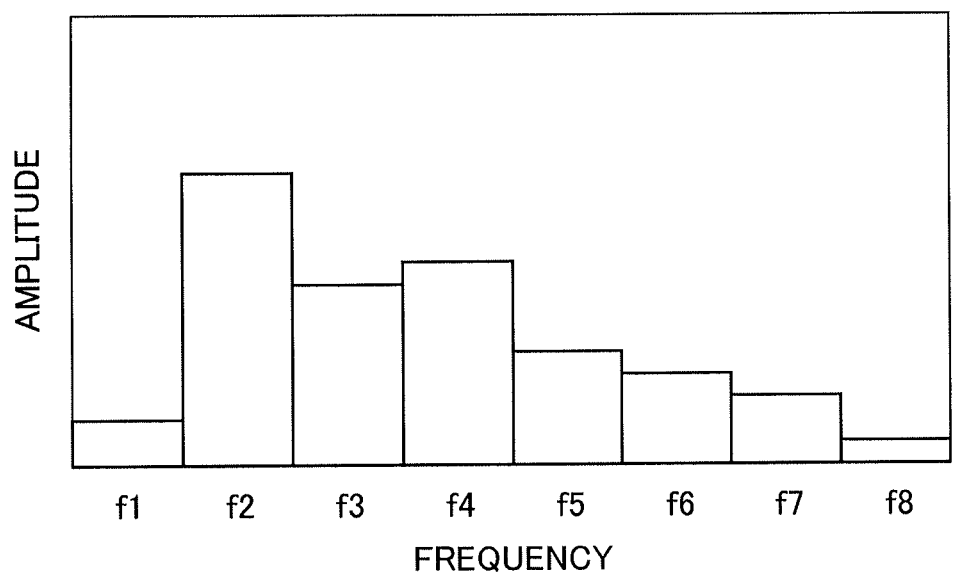
FIG. 26 depicts a spectrum of section F.

In the case of the second process target sound, the spectrum as depicted in FIG. 24 is obtained in the section E as the non-voice section at the generation timing of the operation noise and the spectrum as depicted in FIG. 26 is obtained in the section F.

Figure 25:
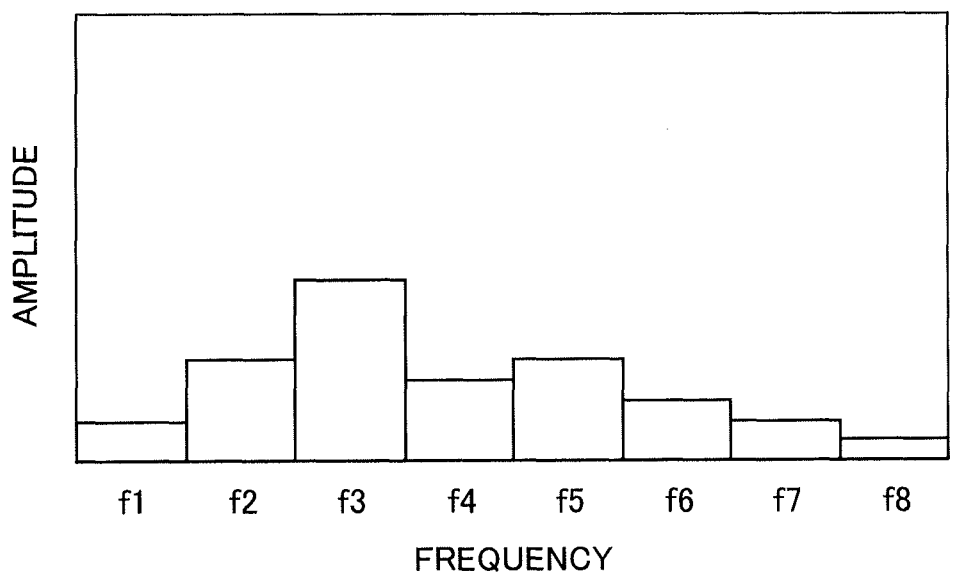
FIG. 25 depicts estimated noise in which a spectrum of the section E is used.

In Step ST8, the noise is estimated based on the spectrum obtained in the section E and updated. The estimated noise after being updated has the spectrum as depicted in FIG. 25.

Figure 27:
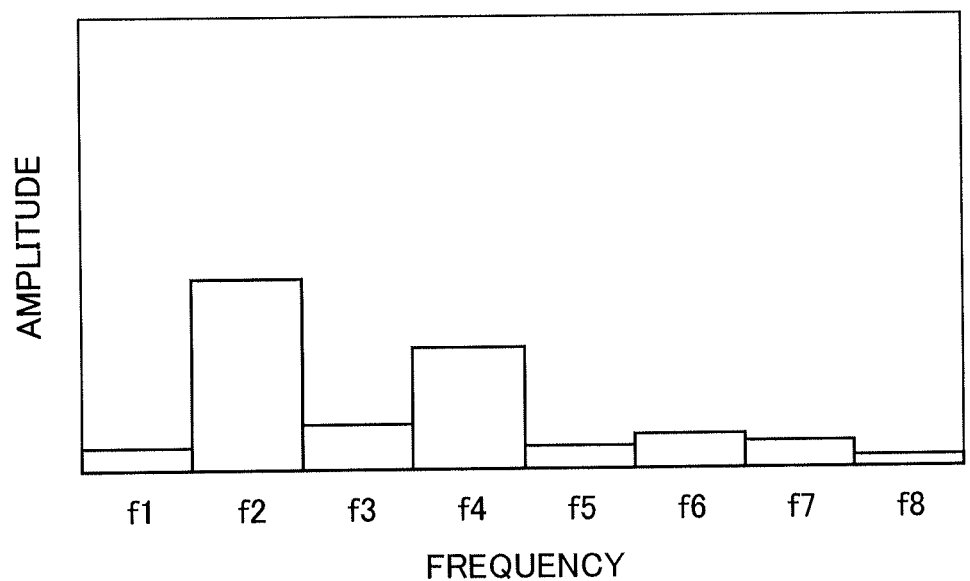
FIG. 27 depicts a spectrum after flooring in which the estimated noise of the section E is used.

In Step ST9, the estimated noise spectrum (FIG. 25) is subtracted from the spectrum (FIG. 26) in the section F and further in Step ST10, the flooring is performed to generate the spectrum as depicted in FIG. 27.

The flooring spectrum for the second process target sound is obtained from the section D in which only background sound is generated. As this flooring spectrum, the spectrum of FIG. 20 is used which is obtained by performing a half-reduction process on the spectrum in FIG. 14 in a manner similar to the case of the first process target sound.

Figure 28:
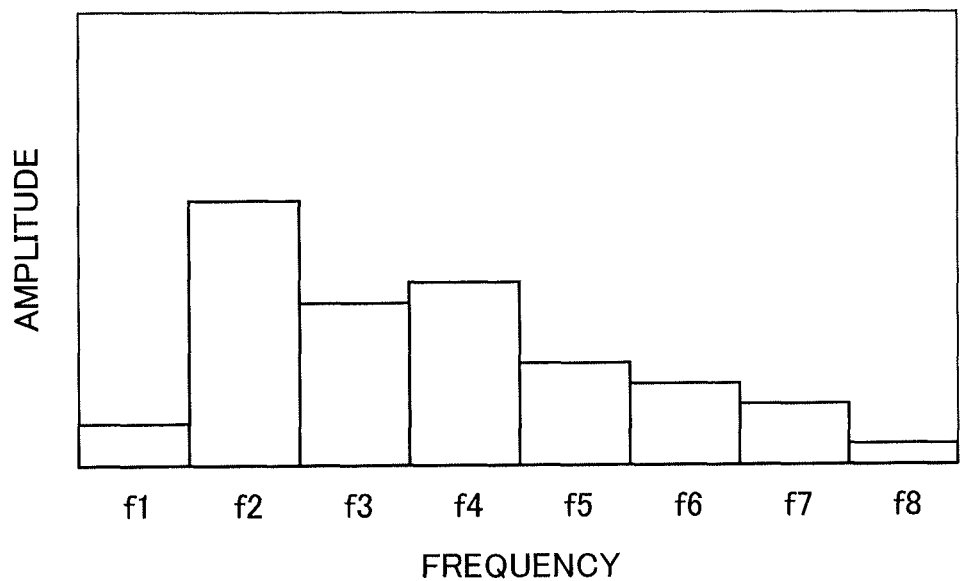
FIG. 28 depicts the estimate noise in which the spectrum of the section F is used.
Figure 29:
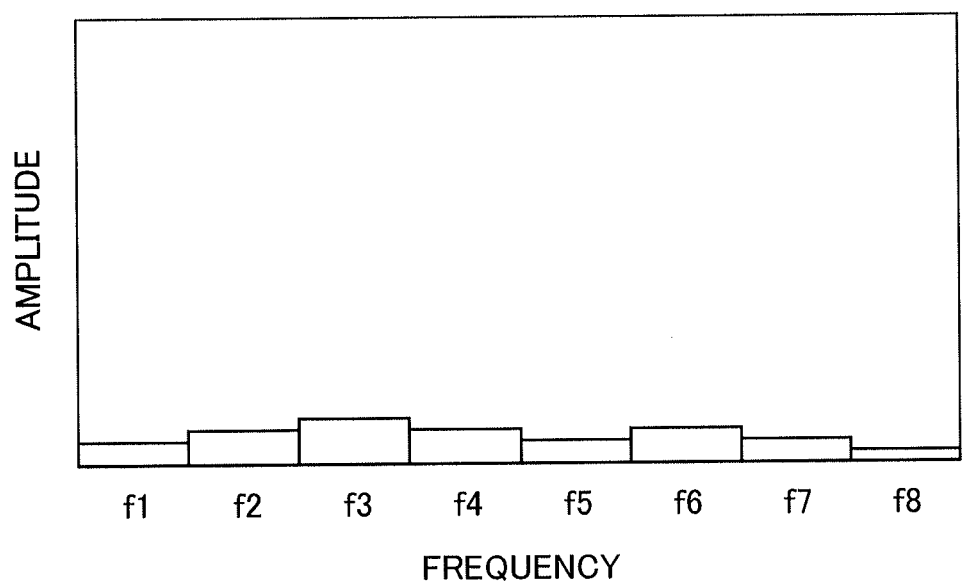
FIG. 29 depicts a spectrum after flooring in which the estimated noise of the section F is used.

Here, if the spectrum subtraction is performed based on the estimated noise (FIG. 28) obtained by multiplying the spectrum (FIG. 26) of the section F by 0.9, the spectrum as depicted in FIG. 29 is obtained. In this case, the spectrum of the voice indicated by f2 and f4 is also subtracted, so that the correct sound information cannot be obtained. In this embodiment, however, the voice spectrum can be maintained as depicted in FIG. 27.

This embodiment thus provides the effects as below.
(1) The voice section is detected based on the sound information collected with the microphone 131. If the voice section is detected, the first noise reduction process is performed when the voice section is detected, the process being weaker than when the non-voice section is detected. Therefore, as compared with the case in which the intensive noise reduction process is performed without distinguishing between the voice section and the non-voice section, the noise can be reduced as appropriate without deteriorating the target sound including the voice and the background sound, especially the voice part.
(2) The first noise reduction process is followed by the second noise reduction process (subtraction of spectrum) for estimating the noise from the sound information in the case here the section is determined as the non-voice section and subtracting this estimated noise. Therefore, since the noise is obtained from the sound information of the non-voice section, the process sound which is very close to the target sound can be obtained without deleting the voice itself.
(3) The generation timing of the operation noise is detected based on the operation information of the drive unit in the camera 100, and upon the detection of the noise generation timing, the noise reduction process is started. Thus, the unnecessary noise reduction process is not performed and the noise reduction process is performed only when necessary.
(4) Since the flooring is performed on the sound information after the second noise reduction process (spectrum subtraction process), the spectrum which might be decreased or disappear by the spectrum subtraction can be corrected. This can prevent the noise from being reduced excessively, and the sound out of the collected sound information, which is close to the target sound, can be secured (recorded).

The present invention is not limited to the embodiment described above and various modifications and changes can be made as described below. These modifications and changes are within the scope of the present invention.

For example, the embodiment describes the configuration in which the sound information collected with the microphone 131 is subjected to the noise reduction process in real time. However, alternatively, the sound information collected with the microphone 131 may be temporarily stored in a buffer memory, etc., and the sound information may be read out of the buffer memory, etc. as necessary to perform the noise reduction process. In this case, the load which would be applied to the device if the process was performed in real time can be eliminated.

The embodiment and the modified embodiment can be implemented in combination; the detailed description is omitted. The present invention is not limited to the aforementioned embodiment.

The invention claimed is:

1. An imaging device comprising:
a movie shooting unit for shooting a movie;
a signal conversion unit for converting sound generated during the shooting of the movie into a sound signal;
a subject determination unit for predicting or recognizing a specific subject;
a noise detection unit for detecting noise included in the sound generated during the shooting of the movie;
a noise reduction unit for reducing a noise signal from the sound signal;
a voice detection unit for detecting a non-noise signal from the sound signal; and
a noise reduction performance change unit for decreasing performance of the noise reduction unit for reducing the noise signal when the subject determination unit predicts or recognizes the specific subject, wherein:
the voice detection unit detects the non-noise signal from the sound signal in a range from a lower-limit threshold to an upper-limit threshold of a frequency of the sound signal; and
when the subject determination unit predicts or recognizes the specific subject, the voice detection unit lowers the lower-limit threshold.

2. The imaging device according to claim 1, wherein:
the noise reduction unit reduces the noise signal from the sound signal on the basis of a noise reduction coefficient; and
when the subject determination unit predicts or recognizes the specific subject,
the noise reduction performance change unit sets the noise reduction coefficient to a relatively low-level reduction coefficient so that the performance of reducing the noise signal is decreased.

3. The imaging unit according to claim 2, wherein
when the subject determination unit does not predict or recognize the specific subject,
the noise reduction unit sets the noise reduction coefficient to a normal-level reduction coefficient, which is larger than the low-level reduction coefficient.

4. The imaging device according to claim 1, wherein
the subject determination unit is a face recognition unit for recognizing presence of a face of the subject on the basis of a video signal taken by the movie shooting unit.

5. The imaging device according to claim 1, wherein
the subject determination unit is a scene mode unit for predicting the specific subject for each of a plurality of prepared shooting modes.

6. The imaging device according to claim 1 wherein
the noise detection unit detects the noise by detecting at least an auto-focusing driving signal.

7. The imaging device according to claim 1, wherein:
when the subject determination unit predicts or recognizes the specific subject, the voice detection unit lowers the lower-limit threshold from a first lower-limit threshold to a second lower-limit threshold so as to increase a detection range of the non-noise signal.

8. The imaging device according to claim 7, wherein
when the subject determination unit does not predict or recognize the specific subject,
the voice detection unit sets the lower-limit threshold to the first lower-limit threshold.

9. A computer system comprising: a processor in communication with program units, the program units comprising:
a subject determination unit for predicting or recognizing a specific subject;
a noise reduction unit for reducing a noise signal from a sound signal corresponding to sound generated during movie shooting;
a voice detection unit for detecting a voice signal of a person or an animal from the sound signal; and
a noise reduction performance change unit for decreasing performance of the noise reduction unit for reducing the noise signal when the subject determination unit predicts or recognizes the specific subject, wherein:
the voice detection unit detects the voice signal from the sound signal in a range from a lower-limit threshold to an upper-limit threshold of a frequency of the sound signal, and
when the subject determination unit predicts or recognizes the specific subject, the voice detection unit towers the lower-limit threshold.

10. A non-transitory computer-readable medium storing a program, the program allowing a computer to operate as:
a subject determination unit for predicting or recognizing a specific subject;
a noise reduction unit for reducing a noise signal from a sound signal corresponding to sound generated during movie shooting;
a voice detection unit for detecting a voice signal of a person or an animal from the sound signal; and
a noise reduction performance change unit for decreasing performance of the noise reduction unit for reducing the noise signal when the subject determination unit predicts or recognizes the specific subject, wherein:
the voice detection unit detects the voice signal from the sound signal in a range from a lower-limit threshold to an upper-limit threshold of a frequency of the sound signal, and
when the subject determination unit predicts or recognizes the specific subject, the voice detection unit lowers the lower-limit threshold.

11. A noise reduction method comprising the steps of:
shooting a movie;
converting sound generated during the shooting of the movie into a sound signal;
predicting or recognizing a specific subject;
detecting noise included in the sound generated during the shooting of the movie;
reducing a noise signal from the sound signal;
detecting a voice signal of a person or an animal from the sound signal; and
decreasing performance of reducing the noise signal when the specific subject is predicted or recognized;
detecting the voice signal from the sound signal in a range from a lower-limit threshold to an upper-limit threshold of a frequency of the sound signal, and
when the specific subject is predicted or recognized, the lower-limit threshold is lowered.

12. An imaging device comprising:
a sound collection device;
a voice section detection unit for detecting a voice section from sound information collected with the sound collection device;

a noise timing detection unit for detecting generation timing of operation noise from operation information of a driving unit in the imaging device; and a noise reduction process unit for performing a different noise reduction process on the basis of a detection result of the voice section detection unit and the noise timing detection unit.

13. The imaging device according to claim 12, wherein the noise reduction process unit performs a first noise reduction process when the voice section detection unit detects a voice section, the process being weaker than when the voice section detection unit detects a non-voice section.

14. The imaging device according to claim 12, wherein the noise reduction process unit performs a second noise reduction process for estimating noise from the sound information when the voice section detection unit detects the non-voice section, and subtracting the estimated noise from the sound information.

15. The imaging device according to claim 12, wherein the noise reduction process unit obtains a flooring spectrum from the sound information when the voice section detection unit detects the non-voice section, and performs a flooring process on the sound information using the flooring spectrum.

16. The imaging device according to claim 12, wherein the voice section detection unit detects the voice section using a peak value of an autocorrelation function obtained by cutting out a part of a voice waveform.

17. A noise reduction method, comprising:
detecting a voice section from collected sound information;
generation timing of operation noise is detected from operation information of a driving unit in an imaging device; and
performing a different noise reduction process on the basis of a detection result of the voice section and the generation timing of the operation noise.

18. The noise reduction method according to claim 17, wherein a first noise reduction process is performed when the voice section is detected, the process being weaker than when a non-voice section is detected.

19. The noise reduction method according to claim 17, further comprising:
performing a second noise reduction process for estimating noise from sound information when the non-voice section is determined, and subtracting the estimated noise from the sound information.

20. The noise reduction method according to claim 17, further comprising:
obtaining a flooring spectrum from the sound information when the non-voice section is determined; and
performing a flooring process on the sound information using the flooring spectrum.

21. The noise reduction method according to claim 17, wherein
the voice section is detected using a peak value of an autocorrelation function obtained by cutting out a part of a voice waveform.

22. A noise reduction device comprising:
a sound collection device;
a voice section detection unit for detecting a voice section from sound information collected with the sound collection device;
a noise timing detection unit for detecting generation timing of operation noise from operation information of a driving unit in an imaging device; and
a noise reduction process unit for performing a different noise reduction process on the basis of a detection result of the voice section detection unit and the noise timing detection unit.

* * * * *